(12) United States Patent
Jian et al.

(10) Patent No.: US 8,130,943 B2
(45) Date of Patent: Mar. 6, 2012

(54) TELEPHONE ACCESSORY DEVICE AND SYSTEM FOR HANDS FREE OPERATION

(75) Inventors: Zheng Yong Jian, Dongguan (CN); Ma Hong Zhen, Gougguan (CN)

(73) Assignee: VTech Telecommunications Limited, Hong Kong (HK)

( * ) Notice: Subject to any disclaimer, the term of this patent is extended or adjusted under 35 U.S.C. 154(b) by 723 days.

(21) Appl. No.: 12/252,038

(22) Filed: Oct. 15, 2008

(65) Prior Publication Data

US 2009/0175439 A1   Jul. 9, 2009

Related U.S. Application Data

(60) Provisional application No. 61/018,781, filed on Jan. 3, 2008, provisional application No. 61/085,970, filed on Aug. 4, 2008.

(51) Int. Cl.
*H04M 1/00* (2006.01)

(52) U.S. Cl. .................. 379/441; 379/447; 379/448

(58) Field of Classification Search .................. 379/447, 379/448, 428, 430, 425, 454, 441; 455/462, 455/74.1, 567
See application file for complete search history.

(56) References Cited

U.S. PATENT DOCUMENTS

| | | |
|---|---|---|
| 6,009,166 A | 12/1999 | Polito et al. |
| 6,081,596 A * | 6/2000 | Britto et al. ................... 379/447 |
| D469,756 S | 2/2003 | Richardson et al. |
| D482,674 S | 11/2003 | Rath et al. |
| 6,735,453 B1 | 5/2004 | Bobisuthi et al. |
| 2004/0131174 A1 | 7/2004 | Lucey et al. |

OTHER PUBLICATIONS

GN Netcom GN 1000 RHL Data Sheet, GNI-307A, Jan. 2003.
GN 1000 Remote Handset Lifter Competitive Comparison, circa Jan. 2003.
GN 1000 RHL Web Printout, http://web.archive.org/web/20070101090555/http://www1.gnnetcom.com./usa2003/wireless/1000.html, Jan. 1, 2007.

* cited by examiner

*Primary Examiner* — Tuan Nguyen
(74) *Attorney, Agent, or Firm* — McAndrews, Held & Malloy, Ltd.

(57) ABSTRACT

A telephone accessory device and system for facilitating communication between a wireless headset and wireline telephone. The telephone accessory device includes a device body configured to rest on top of a base of the corded telephone, a device platform connected to the base portion and configured to support a corded handset on a first surface, and a head portion disposed on a second surface of the device platform opposite the first surface. The system includes a wireless headset, a headset base wirelessly coupled to the wireless headset, and the telephone accessory device coupled through a control signal cable to the headset base unit. When the handset is resting on the first surface, in response to control signals from the wireless headset, the head portion is operable to reversibly depress and release a switch hook button of the cradle speaker recess while the device body and device platform remain stationary.

29 Claims, 15 Drawing Sheets

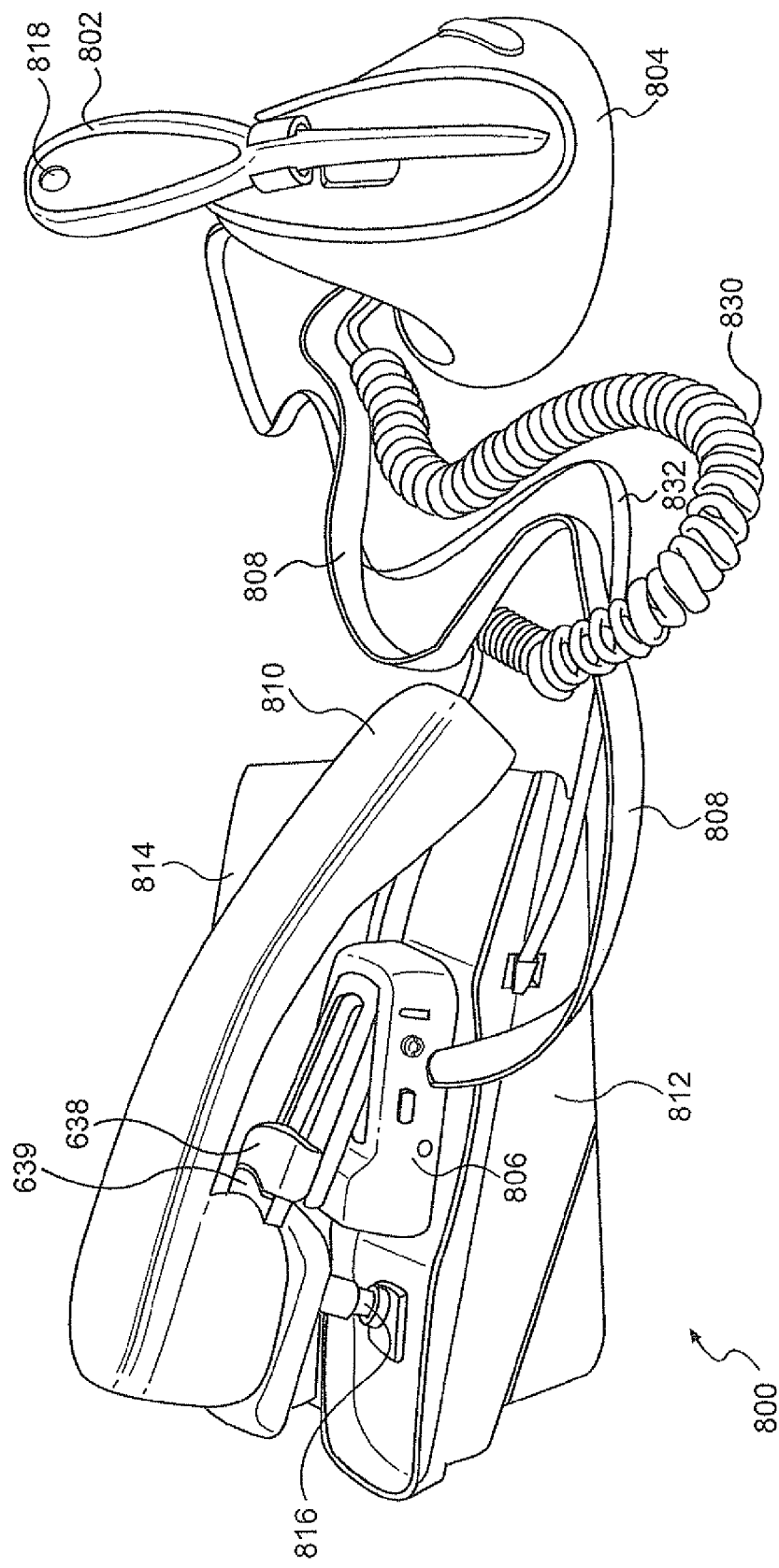

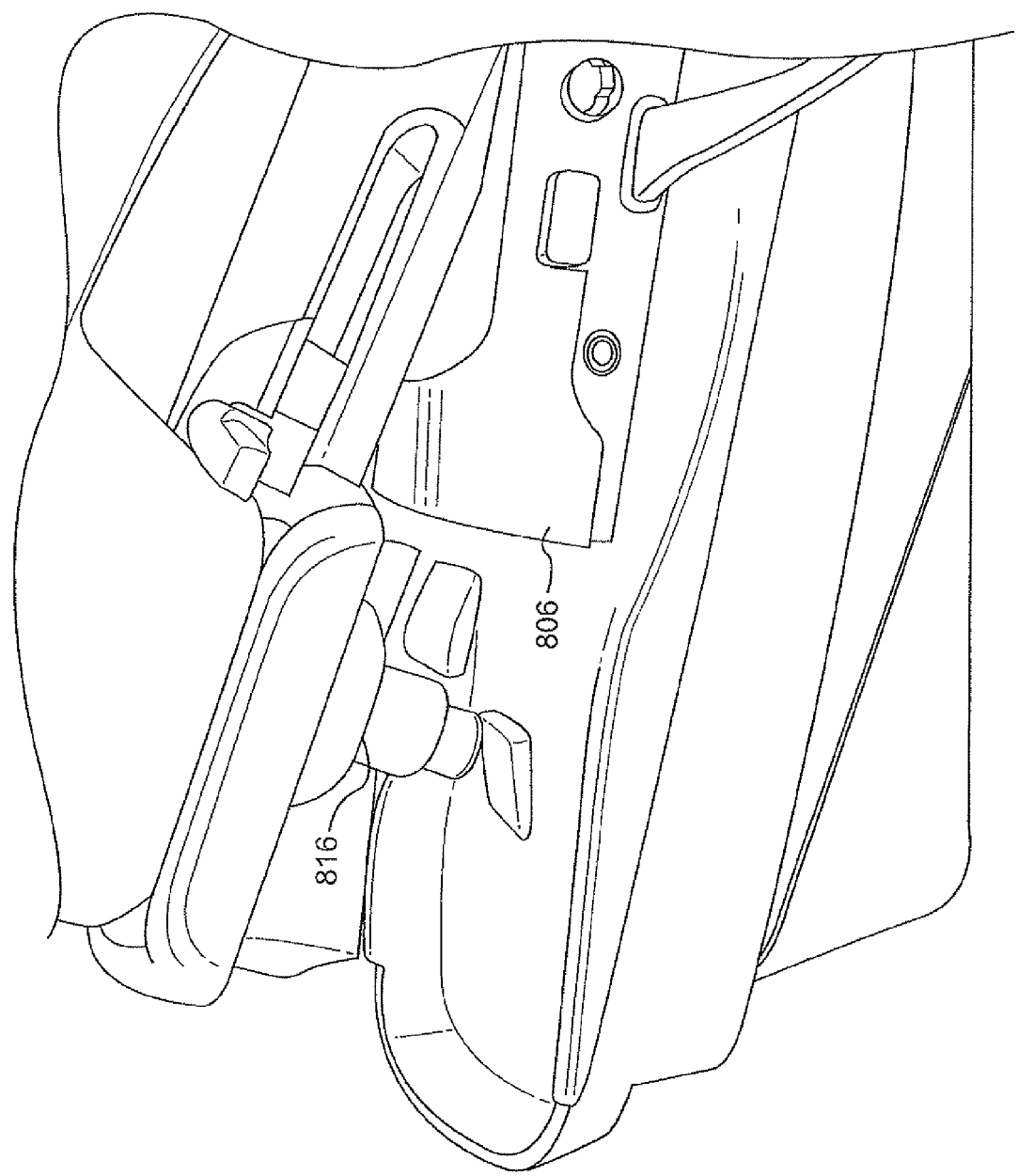

TELEPHONE ACCESSORY DEVICE AND SYSTEM FOR HANDS FREE OPERATION

The present application claims priority to U.S. Provisional Patent Application No. 61/018,781, filed Jan. 3, 2008, as well as U.S. Provisional Patent Application No. 61/085,970, filed Aug. 4, 2008, both of which are incorporated herein in their entirety.

BACKGROUND

1. Field of the Invention

The present invention relates to telephones and, more particularly, to telephone systems using telephone headsets.

2. Background of the Invention

Operation of wired (wireline) telephones using headsets is increasingly common because of the ability of a user to perform other operations while conducting a telephone conversation. In conventional devices, a user can answer a corded telephone by picking up a handset, such as a corded handset, to release a hook switch in a telephone base cradle as normally done, which places the phone off-hook. Headsets can be linked either wirelessly or through wires to the corded phone, wherein when a handset of the corded phone goes off-hook, the speakers and microphone of the headset are operational to conduct a conversation over the phone line connected to the corded phone. For example, in the operation of some corded phones in conjunction with a headset, if the headset wearer receives an incoming ring tone at the corded phone, the headset wearer can lift the handset receiver off the cradle of the corded phone base, placing the phone off-hook, and then proceed to conduct the telephone call through the headset without using the corded handset. Thereby, the user is free to perform other operations. For example, after answering an incoming call at the telephone base, a wireless headset user could move anywhere within a wireless communications range enabled by the wireless link between the headset and phone base while the call is being conducted.

However, such a system places a burden on the headset user to lift the corded handset off-hook to receive an incoming call and to replace the corded handset in the cradle at the end of a call.

For horizontal corded phones in which the handset rests on a base in a horizontal position, known devices have been developed to lift a corded handset off-hook to respond to a telephone call. For example, GN Netcom of Copenhagen, Denmark produces the GN 1000 handset lifter. The lifter in such known devices provides a bar or platform that raises the handset above the telephone base. The lifter is positioned underneath the area of a handset that is normally grasped by a user's hand. When the platform rises to a sufficient vertical height, it engages the handset from beneath and lifts the entire handset in a vertical direction as the platform further rises. Eventually, the handset is raised to a sufficient height above the telephone base that the hook switch (also termed "switch hook" herein) in the base cradle rises up from the cradle and the telephone goes off-hook.

One disadvantage of such a device is that the device places the handset and lifter platform in a position that is vulnerable to accidents when the phone goes off-hook. During a telephone conversation, the handset rests on the platform or bar suspended above the base of the telephone and completely out of the cradle. A passerby or falling object could inadvertently strike the handset and possibly break the lifter mechanism. Moreover, the lifter mechanism requires power sufficient to lift the entire weight of the handset from the cradle to a suspended position each time the phone goes off-hook.

SUMMARY OF THE INVENTION

An aspect of the present invention provides a telephone accessory device for facilitating communication between a headset and wireline telephone by actuating the hook switch of the wireline telephone. The telephone accessory device includes a device body having a substantially planar lower surface and configured to rest on top of a base of the telephone between the speaker and microphone recesses in a cradle area. The surface of the cradle area where the base portion rests can, for example, form an angle with respect to horizontal of less than about forty five degrees. The telephone accessory device further includes a platform that is coupled to the device body through a pivot disposed on a first end of the platform. The platform is configured to support a receiver portion of a handset of the phone on a portion of a first side of the platform that is located at a second end opposite to the pivot (first) end.

The telephone accessory device further includes a head portion disposed on a second side of the platform opposite the first side and towards the second end of the platform, wherein, when the handset is resting on the first surface at the second end, the head portion is operable to reversibly depress and release a switch hook button of the speaker cradle while the device body and device platform remain stationary.

The head portion can include a movable head insert that is configured for slidable motion with respect to the rest of the head portion in a direction generally perpendicular to the plane of the platform.

The telephone accessory device can be configured so that when the body is placed on a cradle portion of the telephone base, and a handset receiver is placed upon the platform of the telephone accessory device, the movable head insert is operable to move between two different states: 1) a first range of positions, in which the movable head insert is disposed outwardly from the rest of the head portion and depresses a hook switch button located in the receiver portion of the telephone base cradle; and 2) a second range of positions in which the movable head insert is disposed more inwardly towards the rest of the head portion and is raised above the hook switch button so as to allow the phone to be off-hook. The movable head insert can be configured to come to a rest at an outward position in the first range of positions and to come to a rest at an inward position in the second range of positions.

The telephone accessory device further is electrically linked to a headset that is coupled to the corded telephone device. Accordingly, the telephone accessory device is configured to move the movable head insert in response to a signal received from the headset. For example, a user may turn on a headset, which sends a signal to the telephone accessory device to raise the movable head insert away from the hook switch. When the phone call is complete, the user may turn off the headset, in which case a signal is sent to the telephone accessory device to lower the movable head insert to depress the hook switch. Accordingly, a headset user is provided with a means to take a telephone off-hook or place it on-hook without having to physically manipulate the handset. Furthermore, the phone handset is not physically disturbed in the process.

The telephone accessory device can include a platform spring that extends between the platform and device body. The platform spring is configured with a spring force sufficient to substantially raise the platform when a cordless handset receiver portion is removed from resting on the platform and to compress under the typical weight of a handset. The platform spring can be configured to raise the platform a distance that is sufficient to allow the hook switch button in the receiver cradle to extend fully outward from the corded telephone base even when the movable head insert is fully outwardly extended from the head portion of the telephone accessory device. Accordingly, even with the telephone accessory device in place resting on the corded telephone cradle, the telephone can be taken off-hook or placed on-hook by simply picking up the handset or putting down the handset on top of the telephone accessory device.

In alternative embodiments of the present invention, the telephone is either a corded telephone or a cordless telephone.

In accordance with another embodiment of the present invention, a system for hands free operation of telephone calls includes a wireless headset, a headset base unit configured to communicate wirelessly with the wireless headset, and a telephone accessory device coupled to the headset base unit through a wired connection. The telephone accessory device is configured to rest on a cradle area of a base unit of a wireline telephone, wherein the telephone accessory device is configured to support a handset of the wireline telephone. The telephone accessory device includes a movable head insert that is configured to toggle between a retracted position and an extended position according to signals received from the headset base unit. The system is configured such that pressing of a switch or button on the wireless headset triggers the wireless headset to send an "on/off" signal to the headset base unit, which is forwarded to the telephone accessory device, thereby triggering the movable head insert to toggle between extended and retracted positions when an "on/off" control of the wireless headset is pressed.

In accordance with an embodiment of the present invention, the telephone accessory device includes an adjustable platform, wherein the telephone accessory device can be configured such that the extended position of the movable head insert places a hook switch in the cradle of the wireline telephone on-hook, while the retracted position of the movable head insert places a hook switch in the cradle of the wireline telephone off-hook. In accordance with embodiments of the present invention, the movable head insert is a lightweight stylus configured to move rapidly between extended and retracted positions.

In accordance with an embodiment of the present invention, the headset base unit includes conventional receptacles and telephone wires configured to communicate with the wireline telephone. Accordingly, when an incoming call is received at the wireline telephone, the system is operable to permit a wireless headset user located within wireless communications range of the headset base to place the wireline telephone off-hook using the telephone accessory device, and is further operable to transmit to a user of the wireless headset incoming telephone communications sent to the wireline telephone, as well as to receive communications from the wireless headset and forward them to the wireline telephone. The system further permits the wireless headset user to place the wireline telephone back on-hook when the user is within the wireless communications range of the headset base unit. Accordingly, a wireless headset user can rapidly place a hook switch of the wireline telephone off-hook to receive an incoming telephone call at the wireline telephone, conduct a conversation, and rapidly hang up the wireline telephone, all in a "hands-free" mode that only involves minimal pressing of a headset control, and all with minimal or no movement of the wireline telephone handset.

BRIEF DESCRIPTION OF THE DRAWINGS

The above-mentioned and other features and advantages of this disclosure, and the manner of attaining them, will become more apparent and the disclosure itself will be better understood by reference to the following description taken in conjunction with the accompanying drawings.

FIGS. 6b and 6c illustrate a top and bottom view, respectively, of a telephone accessory device platform for the embodiment of the present invention depicted in FIG. 6a.

FIG. 8a depicts a system for hands-free operation of a phone call, in accordance with embodiments of the present invention.

FIG. 8b depicts a close-up perspective view of a headset base unit of the system of FIG. 5a.

FIG. 8c depicts a close-up view of a telephone accessory device in an extended position for the system of FIG. 8a.

FIG. 8d depicts a close-up view of a telephone accessory device in a retracted position for the system of FIG. 8a.

DETAILED DESCRIPTION OF THE INVENTION

Figure 1:
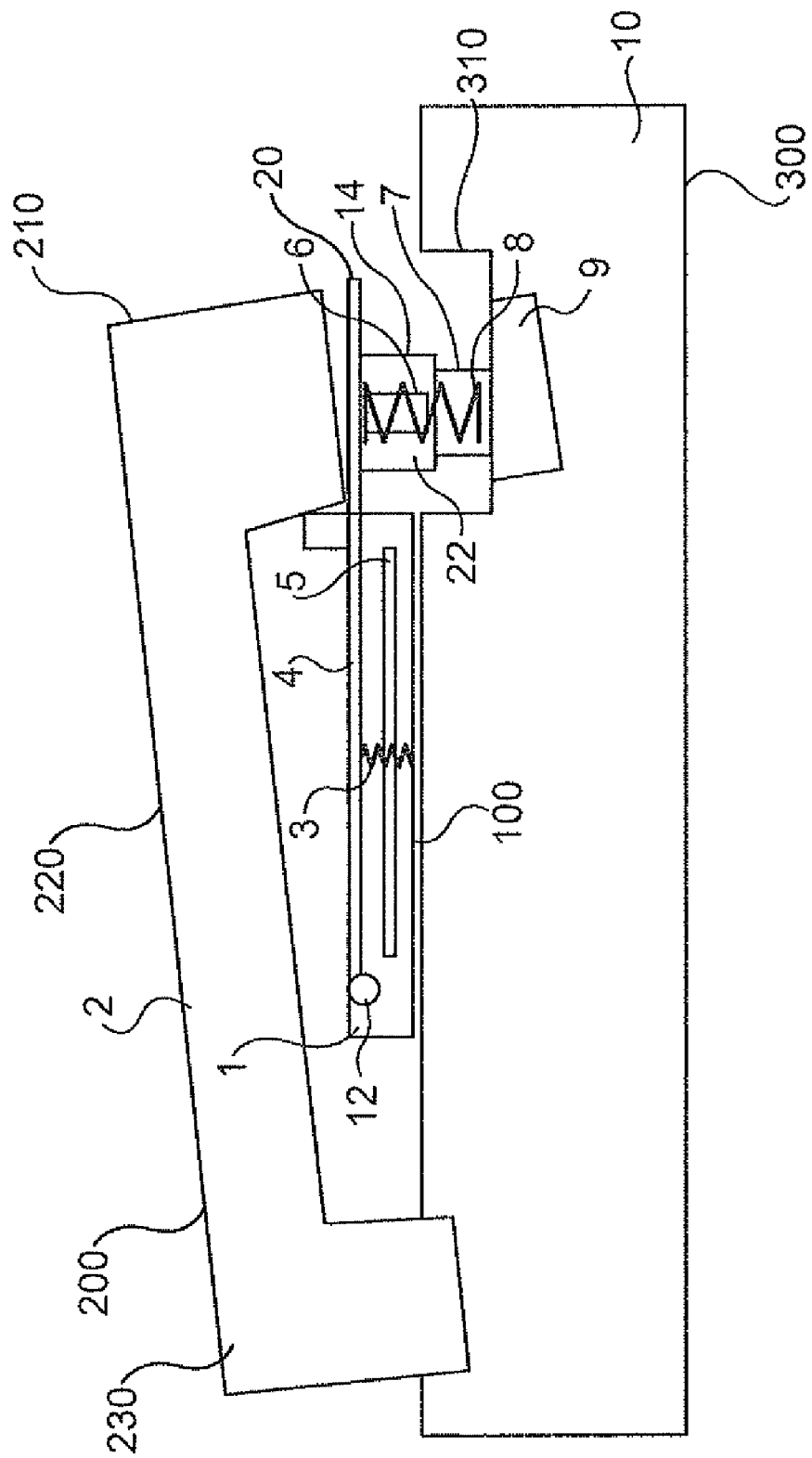
FIGS. 1-3 are schematic depictions in side cross-section of a configuration of a telephone accessory device in operation, at three different possible states, in accordance with an embodiment of the present invention.

The invention will be described with reference to the accompanying drawings. Corresponding reference characters indicate corresponding parts throughout the several views. The description as set out herein illustrates an arrangement of an embodiment of the present invention and is not to be construed as limiting the scope of the disclosure in any manner.

FIGS. 1-5 depict generally the operation of a telephone accessory device 100, arranged in accordance with an embodiment of the present invention. Telephone accessory device 100 is configured for operation with wireline telephones, such as corded or cordless telephones, that have a base with preferably a generally horizontal cradle meant for use on a flat surface, such as a desk, tabletop, countertop or other top surface. The term "wireline" telephones refers to any telephones that receive communications over a wired connection, such as corded or cordless telephones connected to a PSTN. Although horizontal cradles are preferred, telephone accessory device 100 can also be used in conjunction with bases having a cradle disposed at an angle with respect to the horizontal, for example, up to about 30-45 degrees with respect to horizontal. Telephone accessory device 100 is configured to operate so long as the angle of the telephone cradle is not so steep that slippage of a telephone handset is caused when device 100 is disposed between the telephone handset and base, and so long as the phone handset exerts sufficient force on the telephone accessory device, as discussed further below. In one embodiment, telephone accessory device is used when the angle of the flat plane of the base unit is about 30 degrees or less with respect to horizontal.

More generally, telephone accessory device 100 is configured to operate with any telephone having a cradle inclined at less than or equal to about 45 degrees with respect to horizontal, wherein the cradle contains a hook switch that can be actuated (i.e., reversibly depressed and released) to place the telephone on-hook or off-hook.

FIG. 1 is a schematic depiction in side cross-section of an exemplary configuration of a telephone accessory device 100, wherein device 100 is disposed between a handset 200 and a telephone base 300, for example, a telephone base of a corded telephone. This arrangement is depicted in a perspective view illustrated in FIG. 5, which shows an exemplary telephone accessory device used in conjunction with a corded wireline telephone. As shown, telephone accessory device 100 rests on the top, generally horizontal surface of base 300 in the region of the corded telephone base that is generally referred to as a cradle, because it is configured normally to directly support the corded handset 200 when on-hook. For example, base 300 is provided with a speaker cradle recess 310 that retains handset speaker portion 210 under conventional operation.

When telephone accessory device 100 is used, it occupies a portion of the cradle area generally under the neck portion 220 of corded handset 200 resting above telephone accessory device 100. In addition, telephone accessory device 100 extends over the speaker cradle recess, as depicted. Telephone accessory device 100 can be configured such that it does not extend under handset microphone portion 230, so that handset microphone portion 230 can rest upon base 300.

Figure 5:
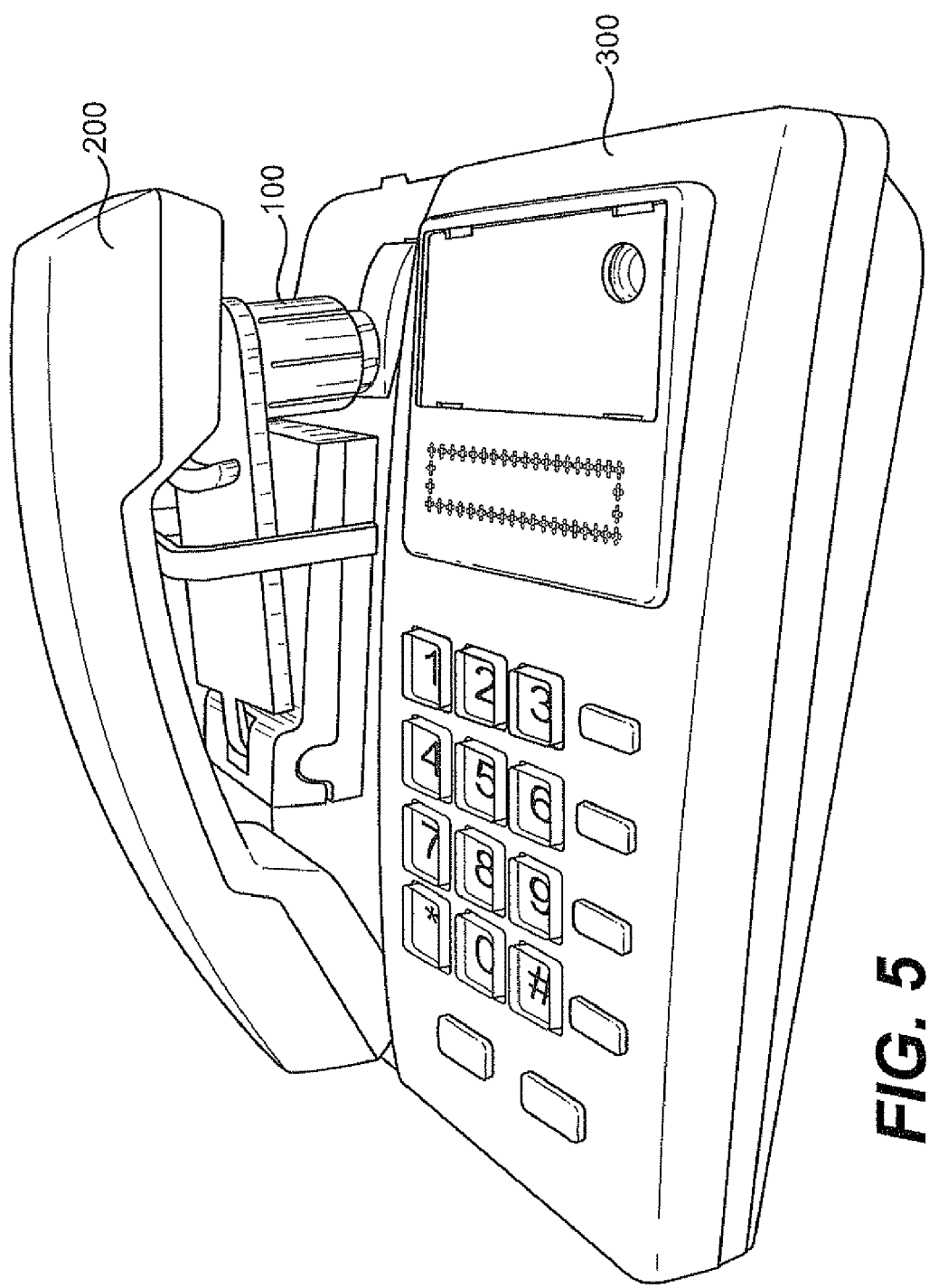

Telephone accessory device 100 includes a device body 1 that can be generally flat, that is, device body 1 has a substantially planar lower surface. Device body 1 is configured to rest on base 300 between handset speaker recess 310 and a handset microphone receiver region located underneath microphone 230. The term "substantially planar surface" is not meant to limit the shape of the lower surface of device body 1 to a perfect plane, but to indicate that at least some portions of the lower surface lie in substantially the same plane so as to provide for stable placement on a telephone base 300, which generally is flat in the region between microphone and speaker recesses in the cradle, as depicted in FIG. 5. In the embodiment of the present invention depicted in FIGS. 1-3, device body 1 is connected to a platform 4 through a pivot 12, which can be a hinge. As depicted in FIG. 3, and discussed further below, platform 4 (also referred to herein as "device platform") is configured so that it can pivot upwardly with respect to device body 1.

Telephone accessory device 100 is configured so that the speaker portion 210 of handset 200 can rest upon the top surface of platform 4 at a region proximate to the end 20 of platform 4 that is opposite to the platform end containing pivot 12. (The term "end" is not limited to the extreme distal portion of a structure, but is used to indicate a region located toward one side or the other of a structure. The specification of which "end" is being described is generally accomplished by use of a modifying term or phrase to indicate a portion of the structure that is located either in proximity or remotely from another entity, such as "end containing hinge 12" or "end region . . . that is opposite to the . . . end containing hinge 12.") Telephone accessory device 100 also includes a head portion 14 that is disposed on the bottom surface of platform 4 generally at a position towards end 20, such that head portion 14 can extend into speaker recess 310 (also termed "cradle speaker recess"). Advantageously, telephone accessory device can be slid along the top of base 300 so that head portion 14 is generally located over a hook switch 9, discussed further below. Head portion 14 includes an outer portion 22 and a movable head insert 7 that is configured to slide in and out of outer portion 22 in a direction generally orthogonal to the plane of platform 4. In the position shown in FIG. 1, movable head insert 7 is disposed so as to extend substantially fully outside of outer portion 22. The term "movable head insert," as used herein, refers to an element of head portion 14 that is movable with respect to another part of the head portion (for example, outer portion 22) as well as with respect to platform 4.

In embodiments of the present invention, telephone accessory device 100 includes a DC motor configured to receive signals that cause the DC motor to drive movable head insert 7 inwardly, outwardly, or in both directions, with respect to outer portion 22.

In one embodiment of the present invention, head portion 14 also contains spring 8, which is coupled to movable head insert 7 and is configured to exert a force so as to push movable head insert outwardly from outer portion 22. When extended outwardly, movable head insert 7 engages hook switch button 9 and depresses button 9 sufficiently to maintain corded telephone in an on-hook condition. Thus, without an external restraint or applied force, spring 8 would exert a force on movable head insert 7 that would cause insert 7 to assume a position so as to maintain an on-hook position.

In another embodiment of the present invention, spring 8 could be configured so that, absent an external applied force or restraint, spring 8 tends to retain movable head insert 7 partially or substantially completely within outer portion 22 so as to maintain an off-hook condition absent an applied force or restraint. Accordingly, in alternative embodiments of the present invention, head portion 14 can be configured such that an applied force, for example, from a DC motor, is used to tale base 300 off-hook, or alternatively, to place base 300 on-hook, as described further below.

Figure 2:
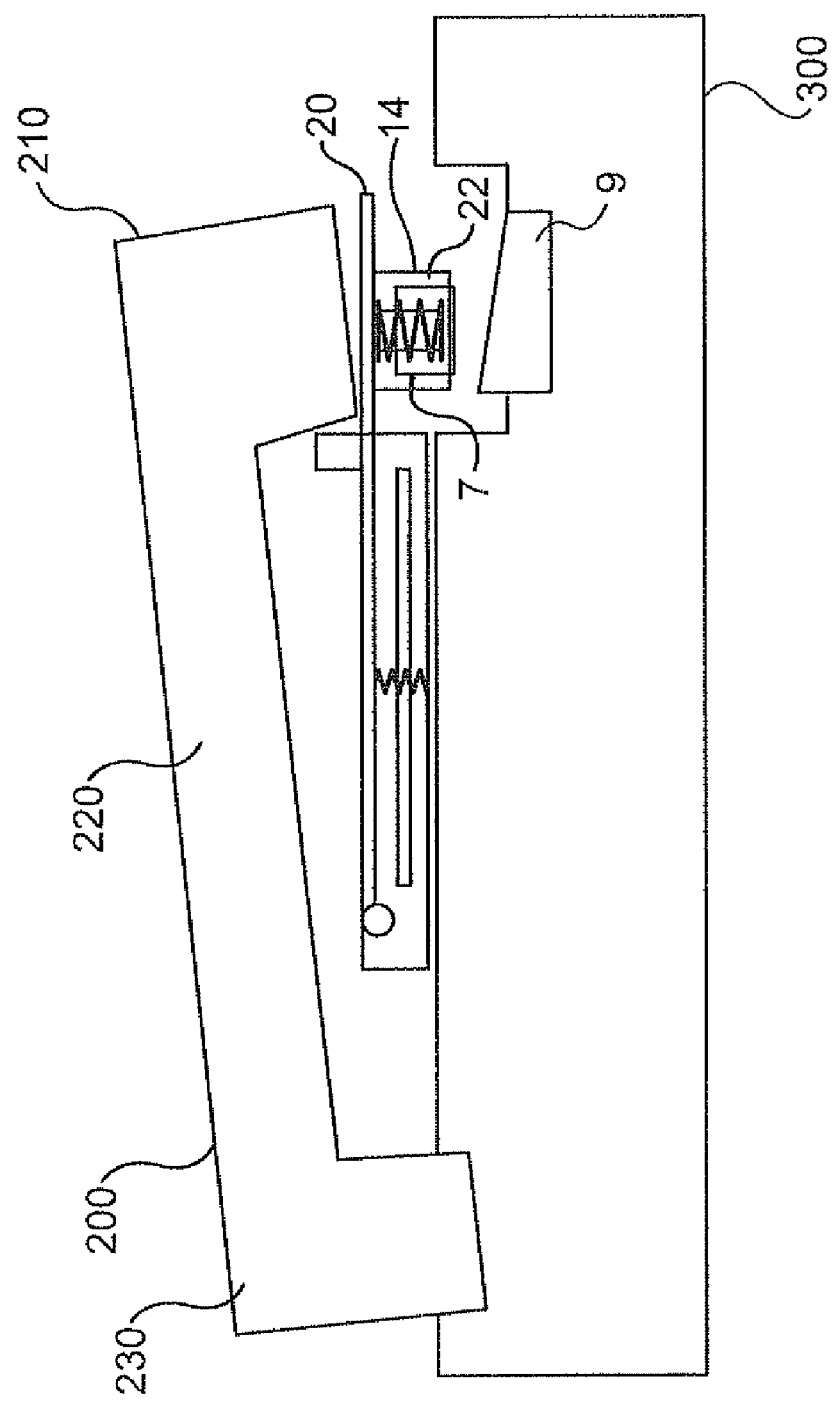
Figure 3:
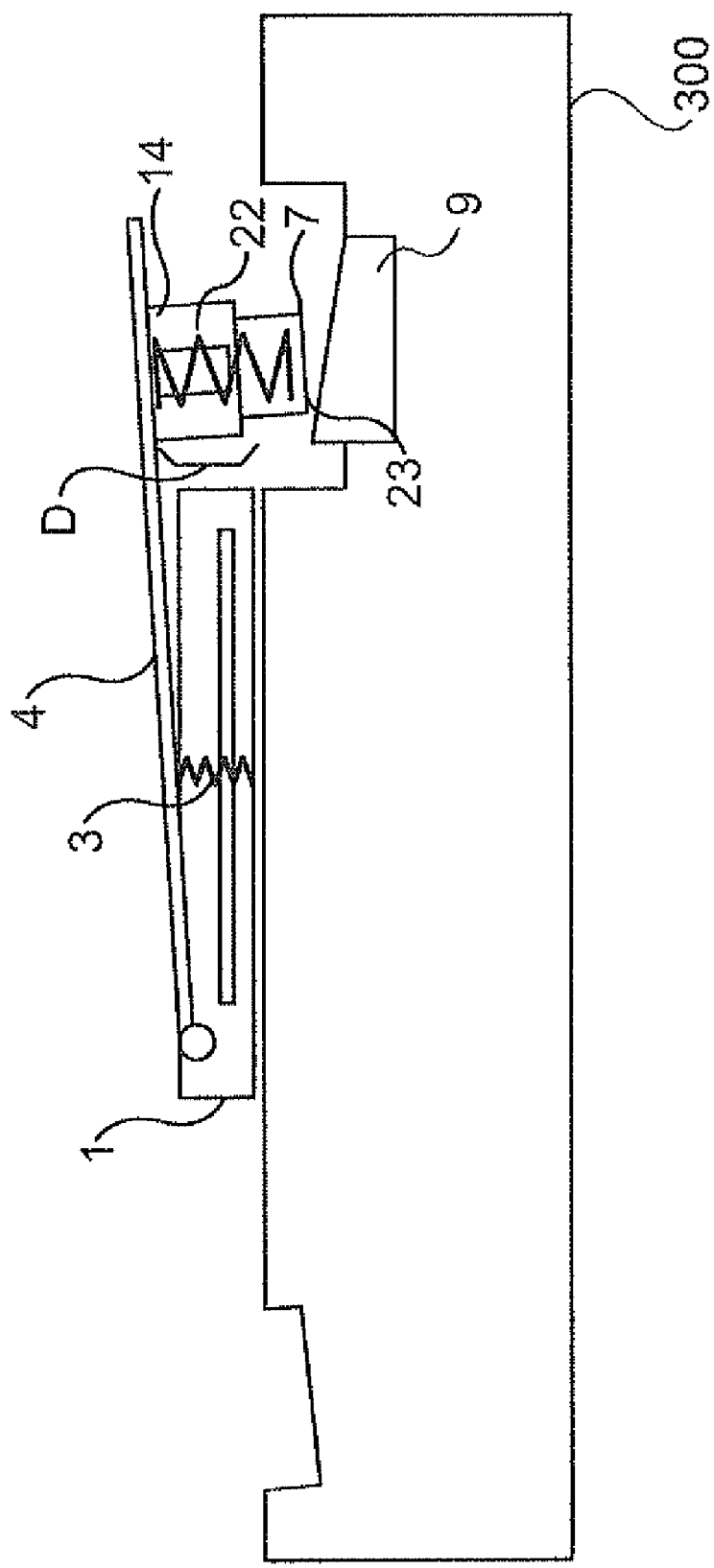

In the embodiment of the present invention shown in FIG. 1, telephone accessory device 100 also includes an electromagnetic switch 6 that is configured to supply a force to drive movable head insert 7 inwardly (in an "up" direction as depicted in the figures) as further illustrated in FIG. 2.

FIG. 2 illustrates a position of telephone accessory device 100 in which movable head insert 7 is substantially disposed inside outer portion 22. In this position, hook switch button 9 is free to extend upwardly to a maximum extent, thereby placing base unit 300 off-hook. Notably, the position of body 1, platform 4, and handset 200 are the same in the arrangement in FIGS. 1 and 2. The only portion of telephone accessory device 100 that is disposed in a different position in FIG. 2 with respect to FIG. 1 is movable head insert 7.

Thus, when a corded handset 220 rests on top of telephone accessory device 100, the latter is configured to vary the state of the corded telephone base 300 between an on-hook and off-hook state by movement of movable head insert 7 without appreciable movement of the handset 220 resting above telephone accessory device 100.

Figure 4:
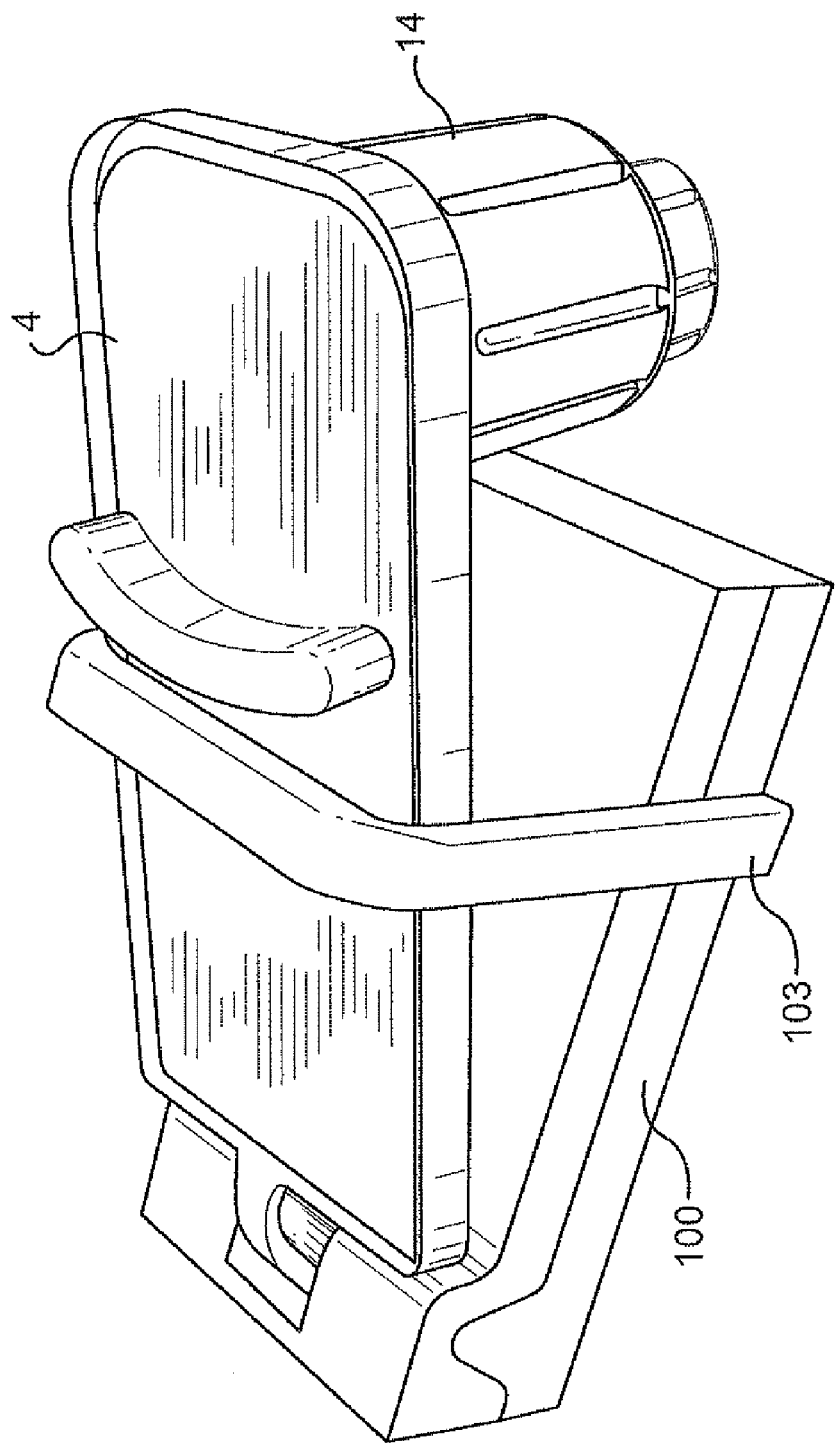
FIGS. 4 and 5 depict in perspective view, respectively, a telephone accessory device standing alone and in an operational configuration disposed between a handset and base of a telephone, in accordance with an embodiment of the present invention.

FIG. 3 illustrates a third position that telephone accessory device 100 is capable of assuming when a handset is removed from resting on the top of platform 4. In the embodiment of the present invention depicted in FIGS. 1-3, telephone accessory device 100 also includes a body spring 3 that extends between body 1 and platform 4 so as to exert a force that tends to pivot platform 4 outwardly from body 1. As shown in FIG. 4, telephone accessory device 100 can also include a limiting member 103 that limits the pivoting travel of the platform 4. As shown, platform 4 pivots up against limiting member 103 under the force of body spring 3.

As depicted in FIG. 3, the strength and travel (the distance between a substantially compressed and a substantially extended state) of body spring 3 can be sufficient to raise platform 4 to a height that permits hook switch button 9 to extend to its maximum extent out of cradle speaker recess 310 when no external weight is placed on platform 4 and movable head insert 7 is fully extended. However, the strength of spring 3 is relatively less than the force exerted when handset speaker portion 210 rests on platform 4, thereby causing platform 4 to pivot inwardly toward a more parallel alignment with body 1, as depicted in FIG. 1. This causes the outer portion of movable head insert 7 to fully depress hook switch button 9, as discussed above.

Although the platform 4 is depicted as extending in a direction substantially parallel to the plane of body 1 in FIGS. 1 and 2, in other embodiments of the present invention, platform 4 can be inclined at an angle with respect to body 1. In other words, when portion 210 of handset 200 is resting on platform 4, spring 3 can be configured with sufficient strength such that it causes platform 4 to extend at an angle with respect to body 1, such as that shown in FIG. 5. The angle formed by platform 4 with respect to body 1 can be, for example, less than about thirty degrees when handset 200 is placed on top of telephone accessory device 100. This angle can vary according to the weight of the corded handset placed on top of telephone accessory device 100, since use of a heavier handset can cause spring 3 to be compressed more than the case where a lighter handset is used.

Although body spring 3 is depicted as located under a central region of platform 4, in other embodiments of the present invention, a body spring can be located elsewhere under a platform, such as near or at the position of a hinge, as discussed below with respect to FIGS. 6a and 7a. The spring 3 can also be part of the hinge.

Furthermore, in accordance with embodiments of the present invention, additional means for restricting the motion of a platform are provided, as also discussed below with respect to FIGS. 6a and 7a.

In accordance with an embodiment of the present invention, the telephone accessory device 100 depicted in FIGS. 1-3 is configured to operate with a headset, such as a cordless headset, in the following manner. In accordance with an embodiment of the invention, telephone accessory device 100 includes circuitry 5 (see FIG. 1) that allows telephone accessory device 100 to receive a signal from the cordless headset and to interpret the signal, and transmit an appropriate signal to head portion 14 based on the signal received from the headset. A user of a cordless headset that is configured for use with a wireline telephone equipped with telephone accessory device 100 may be alerted to an incoming telephone call. The incoming call alert provided to the headset user could be provided by a base unit of the telephone receiving the incoming call. Alternatively, in another embodiment of the present invention, a telephone accessory device is provided with an incoming acoustic ring detector to detect the acoustic signal from an incoming call at the base unit, which can be similar to a known acoustic ring detector, and is additionally provided with a transmitter to transmit to a headset a signal indicating an incoming call.

At this point, when an alert is initially given to a headset user that an incoming call signal is being received at a telephone associated with the headset, the configuration of the telephone and telephone accessory device 100 is as shown in FIG. 1. The telephone, such as telephone base 300, is on-hook. If the headset user wishes to answer the call, the user can then turn the cordless headset on, that is, initiate an active state of the headset. In accordance with embodiments of the present invention, the cordless headset is configured to send a signal to the telephone accessory device 100 that indicates the headset is turned on (active). This "headset on" signal causes circuitry in device 100 to send a signal to movable head insert 7 to move up into outer portion 22 of head portion 14, thereby releasing the hook switch button 9, as depicted in FIG. 2. For example, the "headset on" signal could cause circuitry, such as printed circuit board (PCB) 5 to send a signal to a DC motor to drive the movable head insert 7 from a first position where the movable head insert 7 extends outwardly away from platform 4 and at least partially outside of outer portion 22, to a second position where movable head insert 7 is disposed more inwardly within outer portion 22 and towards platform 4. Accordingly, the headset user can take the corded base 300 off-hook to answer a call by turning on the headset, without having to manually pick up the handset 200 and without causing any movement of the handset at all, as is required in known lifter devices.

In accordance with one embodiment of the present invention, in which spring 8 is configured to exert a force that tends to push movable head insert 7 substantially outwardly with respect to outer portion 22, the signal to movable head insert 7 to move inwardly to take hook switch button 9 off-hook involves sending a signal to a DC motor that drives movable head insert 7 inwardly to a predetermined inward position within outer portion 22 and compresses spring 8. Subsequently, movable head insert 7 is maintained at the predetermined inward position until a signal for movable head insert to move outward is received.

In accordance with an alternative embodiment of the present invention, in which spring 8 is configured to exert a force that tends to pull movable head insert substantially inwardly when insert 7 is in an outward position, the signal to movable head insert 7 to move inwardly to take hook switch button 9 off-hook can involve sending a signal to a switch that triggers release of movable head insert 7 from the outward position. In this embodiment, movable head insert 7 is brought to an inward position by the inward-pulling action of spring 8 or by the action of a motor, or by the action of both spring 8 and a motor.

After switch hook button 9 is brought off-hook, the user can then proceed to conduct a telephone call using the cordless headset. When the user is ready to complete the call, the user turns off the headset. When the headset is turned off, a signal is sent that can be received by telephone accessory device 100. This "headset off" signal causes telephone accessory device 100 to send a signal to movable head insert 7 that causes it to move outwardly from outer portion 22, thereby resuming the position shown in FIG. 1. For example, this may be accomplished by sending a signal that switches the electromagnetic switch 6.

In accordance with one embodiment of the present invention, in which spring 8 is configured to exert a force that tends to push movable head insert substantially outwardly with respect to outer portion 22, the signal to movable head insert 7 to move outwardly to place hook switch button 9 on-hook involves sending a signal that triggers release of movable head insert 7 from its inward position, such that the action of releasing the compressed spring 8, or a motor, or both, drives movable head insert 7 outwardly to an outward position at least partially outside of outer portion 22. Subsequently, movable head insert 7 is maintained at the outward position until a signal for movable head insert 7 to move inward is received.

In accordance with an alternative embodiment of the present invention, in which spring 8 is configured to exert a force that tends to pull movable head insert 7 substantially inwardly with respect to outer portion 22, the signal to movable head insert 7 to move outwardly to place hook switch button 9 on-hook can involve sending a signal that triggers a motor to drive movable head insert 7 to an outward position. Subsequently, movable head insert 7 is maintained at the outward position until a signal for movable head insert 7 to move inward is received. If a user wishes to manually take handset 200 off-hook, the user can simply lift the handset, removing it from its resting position on telephone accessory device 100, and thereby causing platform 4 to move away from cradle 310 by virtue of spring 3, for example. This causes the hook switch 9 to release, and the telephone to go off-hook, even if movable head insert 7 is fully extended outside outer portion 22, as depicted in FIG. 3.

In accordance with embodiments of the present invention, the distance between an inward and an outward position of a movable head insert can be maximized by providing a relatively long (in the direction perpendicular to the plane of platform 4) outer portion 22 that can house a relatively long movable head insert 7. For clarity of explanation only (that is, the assumptions set forth below need not apply in all embodiments of the present invention), it can be assumed that it is not desirable to extend the inward surface of the movable head insert substantially outside of the outer portion 22, and can also be assumed that the inward surface of traveling head insert cannot extend inwardly within platform 4. Thereby, as depicted in FIG. 3, the travel available for the movable head insert may be limited to about the length D of the outer portion 22, whose back surface is defined by platform 4 and places a stop on the back surface of movable head insert 7, and whose front surface represents the point of maximum outward extension for the back surface of movable head insert 7. Thus, the length of the outer portion 22 can be designed to be relatively large to allow for a maximum travel for movable head insert 7 between inward and outward positions, which can be set, for example, at the factory. Thus configured, a single accessory device 100 having a single inward and single outward position for movable head insert 7 can be used for many different phones having different cradle/hook-switch configurations that would place platform 4 at different distances with respect to the hook-switch.

According to other embodiments of the present invention, the relative distance between the first position (arbitrarily also termed "outward," for the purposes of this example) and second position (inward) can be adjusted as appropriate. In addition, the absolute position of the inward and outward position of the movable head insert 7 with respect to the outer portion 22 can also be adjustable. For example, the distance traveled by movable head insert 7 might be adjustable with the aid of a user interface (e.g., a screw-type extension fitting) configured to allow a user to adjust settings on the telephone accessory device.

This ability to adjust the relative or absolute inward and outward positions of movable head movable insert 7 is useful to adjust settings to accommodate the configuration of a specific phone and to account for differences in configurations of telephone handsets and base units to be used in conjunction with telephone accessory device 100. For example, it will be apparent to one of ordinary skill that, for most phones, there are a range of positions in which movable head insert 7 can extend outward and cause phone 300 to remain on-hook. In other words, in most phones, the hook switch button is configured such that, while being depressed inwardly towards the recess, the hook-switch button places the phone on-hook while the button still extends outwardly from the bottom of a speaker cradle recess, for example, by a distance of a millimeter or several millimeters. Thus, the possible outward positions of movable head insert 7 that produce an on-hook condition correspond at least to the range of switch hook button 9 from the position at which it places the phone on-hook to the position at which the button cannot be further depressed into the cradle speaker recess. Thus, for maximum assurance that a phone is on-hook, a user may desire to set an outward position such that switch hook button is fully depressed.

Similarly, for a given telephone, it is desirable to provide a range of travel for movable head insert 7 before movable head insert 7 comes to rest at an inward position above the point at which the phone is placed on-hook. Thus, there may be a range of movable head insert positions between the position at which switch hook button 9 takes phone 300 off-hook and the final desired inward position of the movable head insert. For example, it may be desirable to have the movable head insert 7 come to rest about 5 mm or more above the point of physical contact with a switch hook button to ensure that the phone is taken off-hook each time, and to readily visually apprise a user that the phone is off-hook.

Instead of maximizing the robustness of response wherein the travel distance between inward and outward positions of movable head insert 7 is relatively greater, the response speed can be increased by reducing the relative distance between inward and outward positions. Thus, in accordance with one variant of the present invention, the user can determine the approximate transition position of a movable head insert at which the phone goes between off-hook and on-hook states and set inward and outward positions with respect to that transition position. By minimizing the distance between respective inward and outward positions and the transition position, the time for placing an off-hook phone on-hook is minimized and the time for taking an on-hook phone off-hook is minimized. In one variant afforded by the present invention, the user may wish to place the outward position (on-hook position) very close to the transition point, thereby ensuring that a phone can be taken off rapidly, while the inward point can be placed further away from the transition point to ensure that the phone is taken off-hook.

In addition to tailoring the travel range (range between inward and outward positions) of movable head insert 7 for an individual phone system, a user may wish to account for different separations between movable head insert 7 and cradle speaker recess caused by different handset weights. For example, in telephone accessory devices containing body spring 3, the distance between portion 20 of platform 4 and button 9 can vary in accordance with the weight of handset portion 210 that exerts a force against spring 3, which tends to lift portion 20 outwardly from base 300. In addition, the depth of a speaker recess 310 and height of a hook switch button 9 above the bottom of the speaker recess vary between phone systems. Thus, for use with phone systems in which end 20 is more outwardly disposed from button 9 when headset speaker portion 210 is resting on platform 4, telephone accessory device 100 can be provided with a longer head portion 14, such that the distance D between platform end 20 and the outer distal surface 23 of movable head insert 7 can be maximized (see FIG. 3) to thereby ensure that at the most outward position, contact is made to button 9.

In another embodiment of the present invention, the travel range for a movable head insert can be tailored electronically and automatically. For example, to set an upper point for the movable head insert, a headset or headset base unit can be configured to send a signal to retract the movable head insert upwardly until a signal indicating that the telephone has gone off-hook is received. Alternatively, or in addition, to set a lower point, the headset or headset base unit can be configured to extend the movable head insert until an on-hook signal is received. Based on the received off-hook and on-hook signals, the device can automatically adjust the relative or absolute inward and outward positions of movable head movable insert 7 to provide an optimal range of travel distance.

The present invention thus advantageously provides a means by which a user can remotely place a corded phone off-hook, conduct a conversation, and place the corded phone on-hook, without disturbing the handset. In operation, the electrically driven moving part of the telephone accessory device of the present invention, that is, the movable head insert 7, is not substantially exposed to possible damage, being protected by the handset above, by the outer portion 22, and by being downwardly disposed within the speaker cradle area. Moreover, unlike known apparatus that require force capable of lifting an entire handset and maintaining the handset in the lifted position, only a modest force is required to be generated for the device of the present invention to operate. This force is in the range of the force necessary to depress a hook switch button, or the force necessary to compress a spring that in its extended position is strong enough to depress a hook switch button, as depicted in FIGS. 1 and 2. These forces can be anticipated to be substantially less than that required to lift the entire weight of known handsets, thereby allowing an energy efficient, cost efficient, and more rapidly responding system for taking a phone off-hook and placing it on-hook.

For example, although the discussion above has described embodiments of the invention in which a corded telephone is used, the present invention also applies to systems in which a cordless telephone handset and base station are used. Thus, handset 200 can be a cordless handset and base 300 can be a cordless base unit. In addition, the present invention also applies to embodiments in which the telephone accessory device body 1 extends under the microphone portion 230 of a telephone handset so that the handset is simultaneously supported on the platform end containing pivot 12 and the platform end containing head portion 14. In addition, the present invention also applies to embodiments in which the entire telephone accessory device is disposed under the speaker portion 210 of a telephone handset, and does not extend into the cradle area between the speaker and microphone portions. Furthermore, the present invention encompasses embodiments in which the portion of the telephone accessory device configured to rest on the telephone base is not substantially flat. For example, a body portion of the telephone accessory device could be configured on its bottom surface with protrusions (e.g., ridges or feet) designed to contact a telephone base, such that only the outer portion of the protrusions contact the telephone base.

A further aspect of the present invention provides a telephone accessory device comprising a head portion connected to a platform having no hinge or body spring, wherein the accessory device has no separate body portion distinct from the platform. Accordingly, when a user wishes to remove a handset to use the handset to answer a call, the accessory device would also be removed from the speaker cradle so as to take the phone off-hook. Such an embodiment could be conveniently employed in cases where the handset is infrequently used to answer phone calls.

Another aspect of the present invention provides a body and device platform coupled through a spring or set of springs without use of a pivot or hinge, such that the set of springs tends to raise the entire platform rather than to pivot the platform as occurs when the body and platform are connected on one end using a pivot.

Another aspect of the present invention provides a telephone accessory device that includes a platform without a spring that tends to rotate the platform outwardly, but includes an electronic means for detecting when a handset is removed from the platform (e.g., a light sensor, contact switch, or mechanical switch). Accordingly, a signal can be sent to retract the movable head insert from the hook switch when a user manually removes the handset from its resting position on the platform.

In addition, other embodiments of the present invention provide configurations of a telephone accessory device in which the movable portion of the head is not an inner cylinder surrounded by an outer portion. The invention encompasses any configuration of a head in which a fixed portion is coupled to a movable portion that can be reversibly extended and retracted.

Figure 6A:
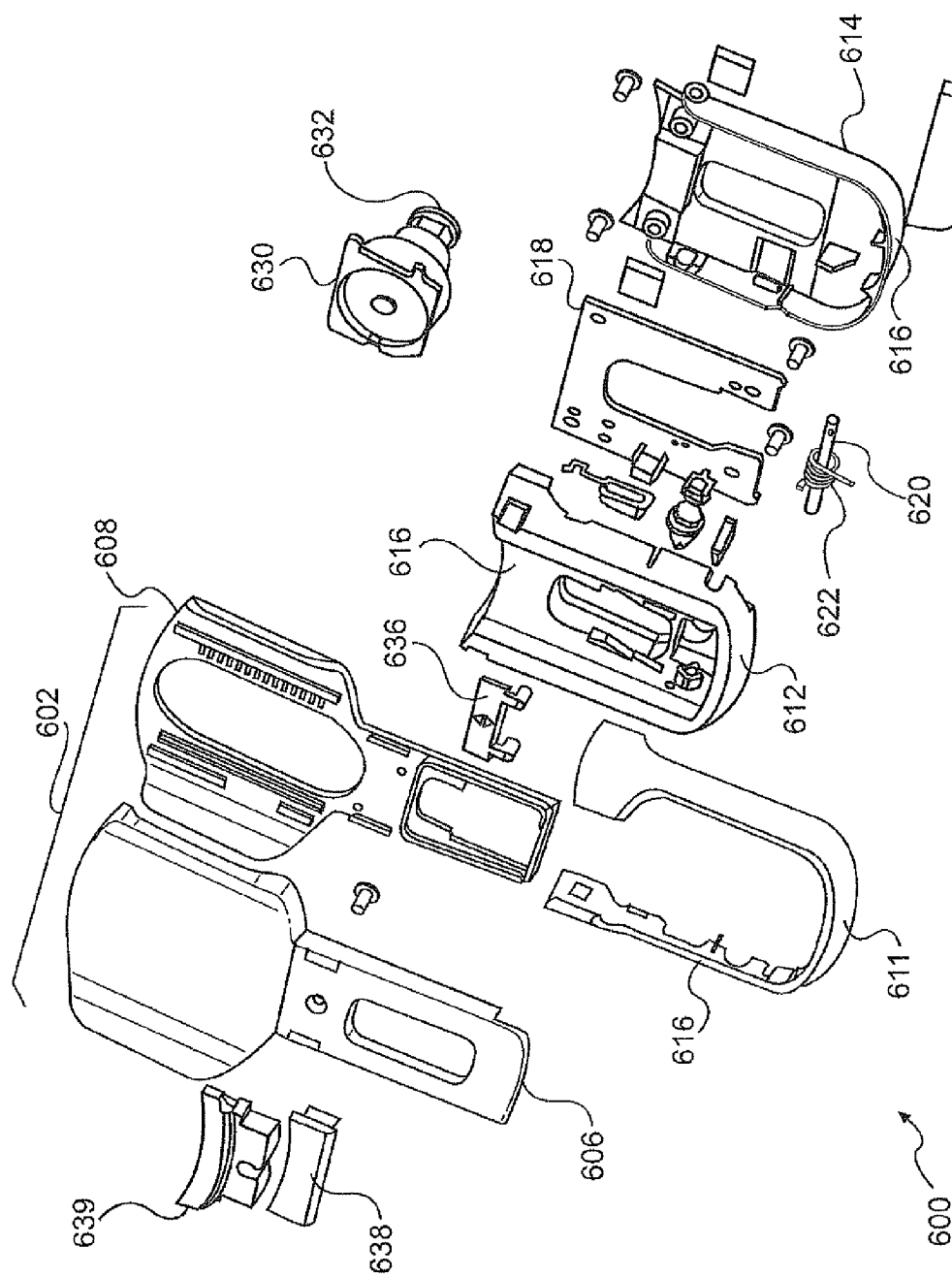
FIG. 6a depicts a drawing of an exploded view of a telephone accessory device, in accordance with an embodiment of the present invention.
Figure 6B:
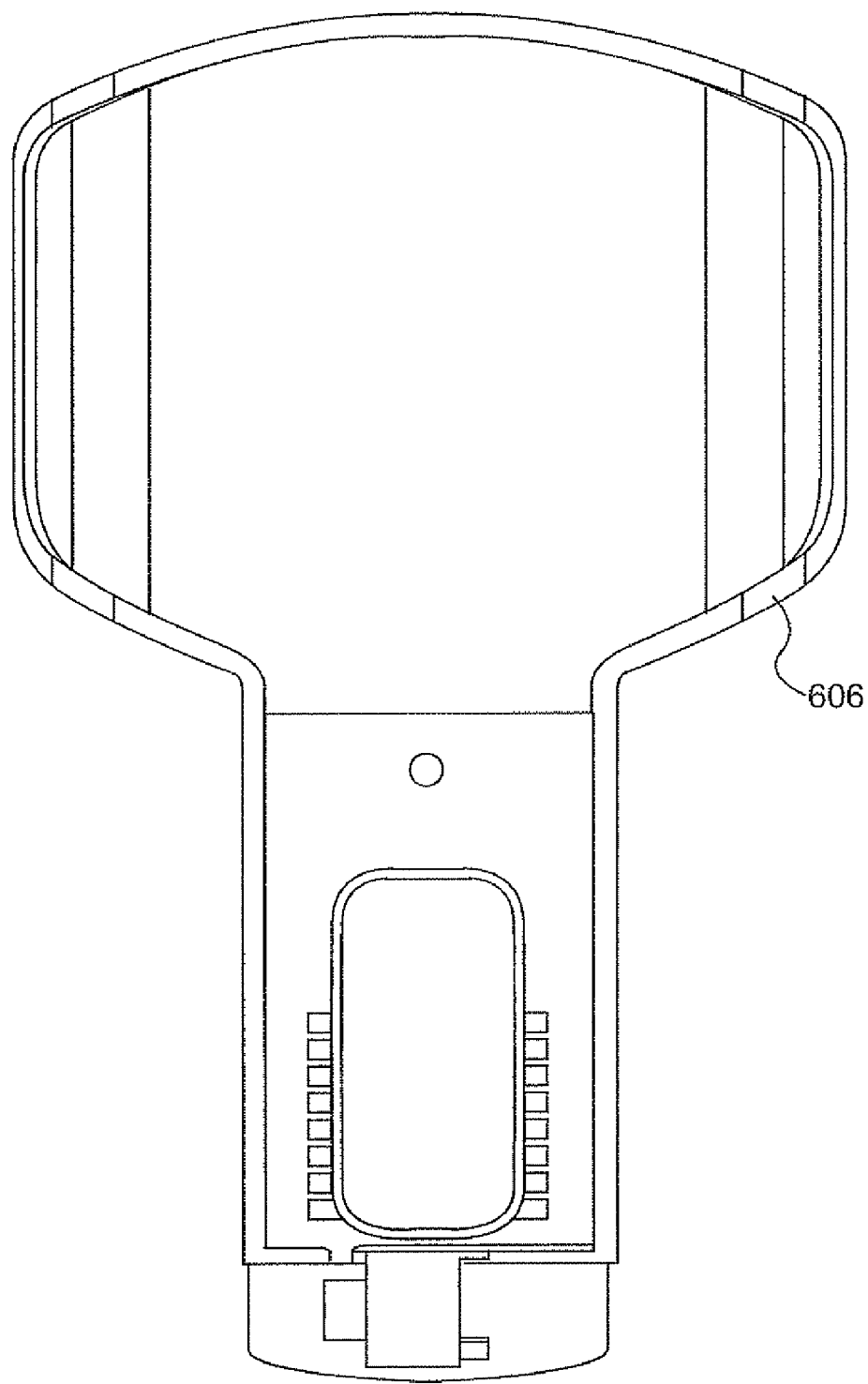
Figure 6C:
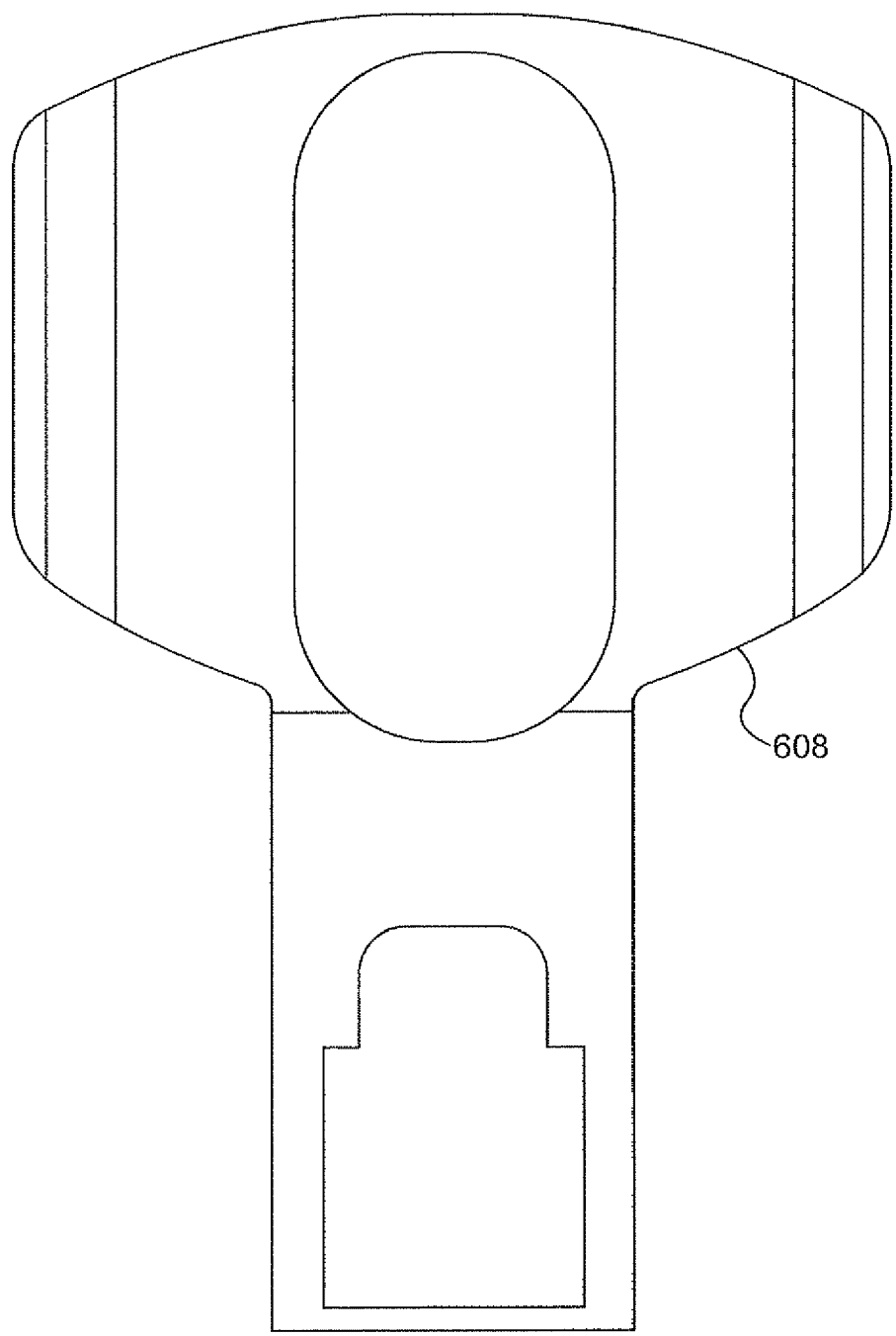

FIG. 6a depicts a drawing of an exploded view of a telephone accessory device 600, in accordance with an embodiment of the present invention. FIGS. 6b and 6c illustrate a top and bottom view of a telephone accessory device platform ("lifter lever") for the embodiment of the present invention depicted in FIG. 6a. Platform 602 is generally "squash racket" shaped, where the racket head portion is configured to support a speaker end portion of a telephone handset, as described above with respect to FIGS. 1-5. The lifter lever includes two generally flat halves 606, 608 that are configured to assemble together, as illustrated in FIGS. 6a-6c.

Figure 7A:
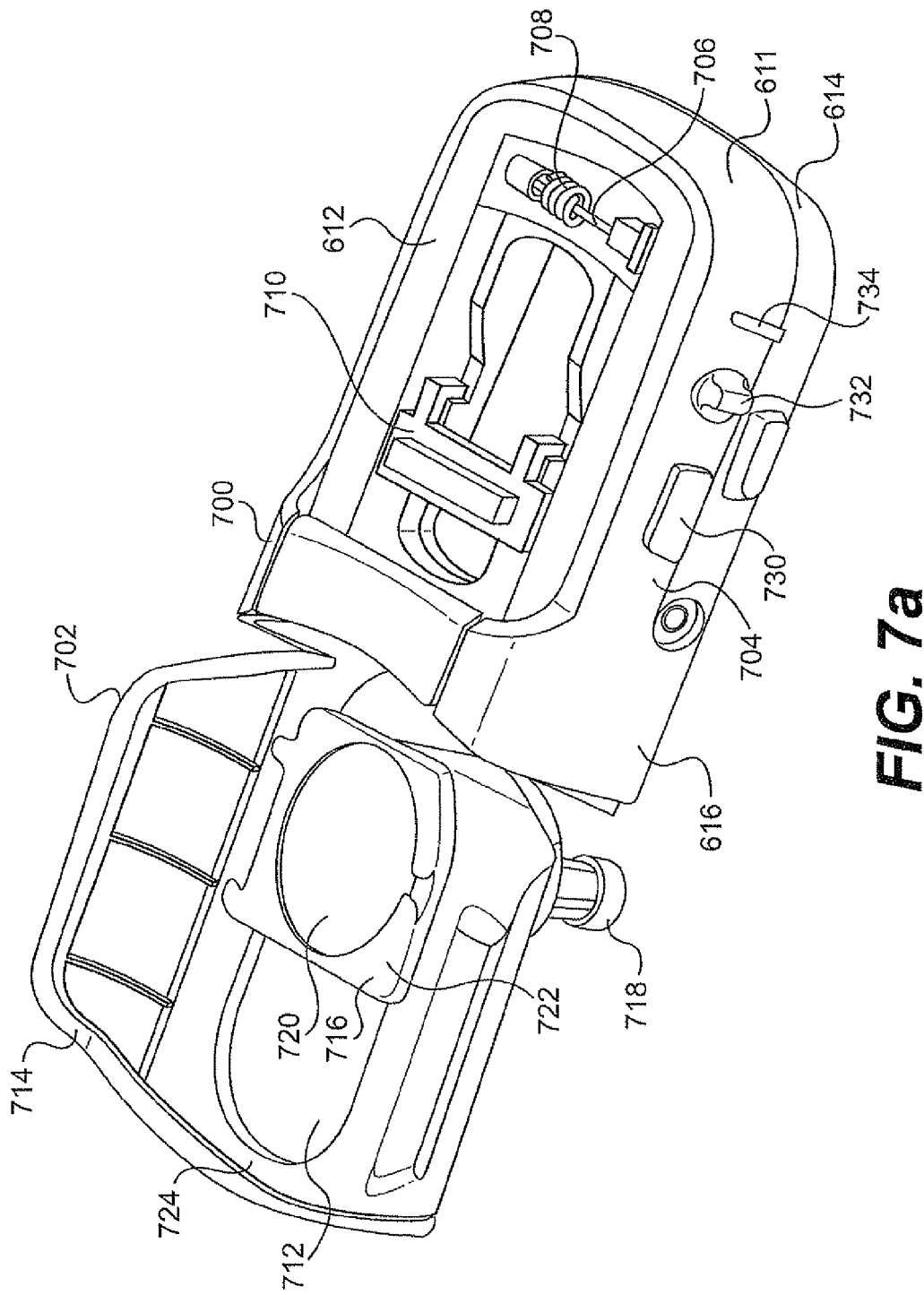
FIG. 7a depicts in perspective view a schematic of a telephone accessory device 700, arranged according to an embodiment of the present invention.

FIG. 6a further depicts cover portion 611, upper portion 612, and lower portion 614 of the telephone accessory device base 616, which are configured to assemble together in the manner depicted in FIG. 7a for a similar telephone accessory device 7a.

As illustrated in FIG. 6a, a printed circuit board (PCB) 618 is disposed between upper portion 612 and lower portion 614 of base 616. PCB 618 includes electronics to receive signals from external devices, such as from a headset base unit, described further below. PCB 618 contains circuitry to control operation of a movable head insert, described further below. Also depicted in FIG. 6a is a lifter shaft 620 on which is mounted a spring 622 that acts to urge platform 602 outwardly from base 616. Spring 622 can be, for example, a coiled helical spring. Lifter shaft 620 lies in a horizontal position along the axis of the pivot point between platform 602 and base 616. The ends of spring 622 are configured to engage base 616 on one end and platform 602 on the other end, thereby supplying a force that tends to oppose the movement of platform 602 in a downward direction towards base 616.

FIG. 6a also depicts a head portion 630 that includes a motor used to drive movable head insert 632. As generally depicted in FIG. 6a, the movable head insert 632 is shaped as a cylinder with a flared outward end that is larger in diameter than the rest of the cylinder. The flared outward end could be used to limit the inward movement of the cylinder by engaging the fixed outer cylinder, or could be used as a cap in the case where movable head insert is hollow, as described below with respect to FIGS. 7b-7c.

As depicted in FIG. 6a, telephone accessory device 600 further includes an adjuster 636 that is slidably disposed within a hollow portion of the platform. The adjuster includes a ridge that protrudes above the plane of the platform so that a user can manually move adjuster 636 to adjust the travel of platform 602, as described further below.

FIG. 6a depicts a stopper 638 and stopper insert 639 that are located on the upper side of platform 602 and configured to support a handset speaker portion and prevent the handset from sliding while resting on platform 602, as further depicted in FIG. 5a.

FIG. 7a depicts in perspective view a schematic of a telephone accessory device 700, arranged according to an embodiment of the present invention. Device 700 is depicted without a top portion of a platform 702, in order to more clearly depict its operation.

Platform 702 and base 704 can be configured similarly to their counterparts illustrated in the exploded view of telephone accessory device 600. Platform 702 is rotatably coupled to base 704 through shaft 706. As explained further below, adjuster 710 can be moved away from shaft 706 to increase the travel permitted for platform 702, and thereby lower the position of the head portion of platform 702 when a handset is resting on top of platform 702.

The bottom half of platform 702 also contains an aperture 712 in head region 714 that allows head portion 716 to be positioned at varying distances from base 704. This facilitates flexibility in positioning movable head insert 718 with respect to a handset cradle, thereby allowing for differences in the positioning of a hook switch to be contacted by movable head insert 718. As illustrated, motor 720 is housed in a housing 722 that engages the top side of the bottom half of platform 702 along the edges of the aperture. The housing 722 is accordingly sandwiched between the top (not shown) and bottom halves of the platform 702 in a manner that permits head 716 to be moved along the long direction of platform 702. Preferably, the top and bottom halves of the platform snugly engage housing 722, such that housing 722 does not move along the aperture absent force exerted by a user.

Base unit 704 also includes an alert on/off switch 730, a sensor adjuster 732, and a status indicator 734, whose operation is described further below.

In accordance with an embodiment of the present invention, base 704 can also include fastening means affixed to the bottom of base 704, such as adhesive pads that are configured to stick to the surface of a telephone cradle area. Accordingly, a user can adjust and fix the relative position of a base with respect to the telephone cradle that base 704 rests upon.

Accordingly, by providing adjuster 710, which allows an adjusting of the relative angle formed by platform 702 with respect to base 700, and by providing slidable head 716, telephone accessory device 700 allows the relative vertical distance of a head portion above a cradle to be adjusted, as well as the relative horizontal distance along the cradle at which the movable head insert 718 is configured to contact the cradle. Once adjustments using the slidable head and the adjuster are made, base 704 can be affixed to the cradle region of the telephone, such that the position of movable head insert 718 is fixed relative to a hook switch to be engaged.

Figure 7B:
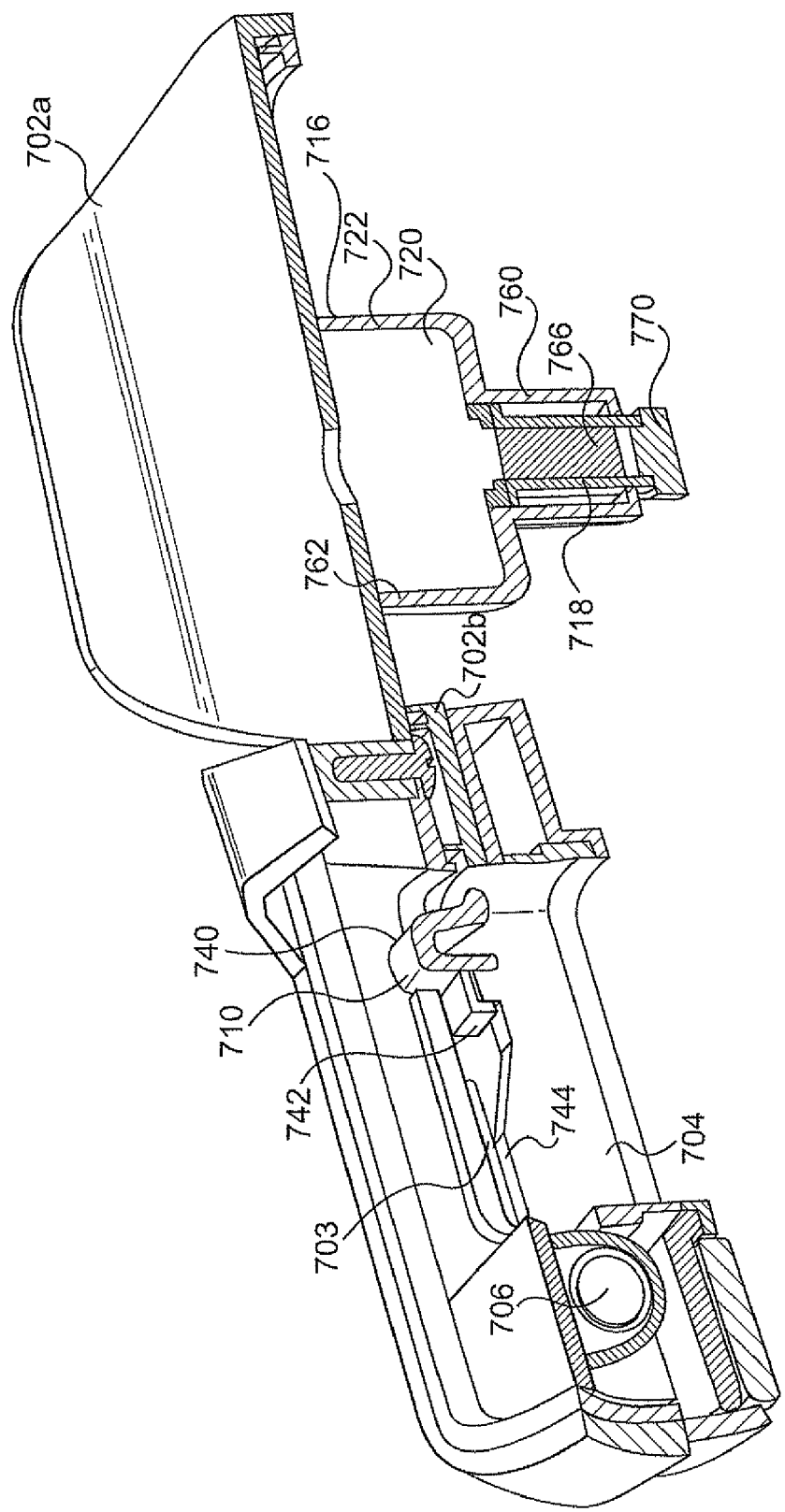
FIG. 7b illustrates a cross-sectional perspective view of the device of FIG. 7a, in the case where a movable head insert is retracted.

FIG. 7b illustrates a cross-sectional perspective view of device 700, in the case where movable head insert is retracted. A top portion 702a of platform 702 is visible, as well as bottom portion 702b of platform 702. As illustrated, an outer portion of adjuster 710 is disposed in a slot 703 that lies between top portion 702a and bottom portion 702b of platform 702. Adjuster 710 is moved by moving along slot 703. Adjuster 710 further includes one or more protuberances 742 disposed on the bottom of adjuster 710 and configured to engage a surface 744 provided in base 704, when platform 702 is rotated downwardly toward base 704. Surface 744 contains at least a portion of its surface that is inclined downwardly in the direction moving away from shaft 706. Accordingly, as adjuster 710 is moved outwardly from shaft 706, platform 702 is able to rotate farther towards base 704 before protrusions 742 abut against surface 744. By providing an inclined portion on surface 744 that accommodates protuberances 742 when adjuster 710 is moved to its most outer position from shaft 706, device 700 is configured to allow platform 702 to rotate to a position substantially parallel to base 704. In accordance with an embodiment of the present invention, adjuster 710 is made of a substantially rigid material that undergoes insignificant deformation under a weight such as that supplied by a phone handset. In this manner, movement of adjuster 710 serves to vary the "stop" position at which platform 702, by engaging surface 744, is prevented or greatly impeded from rotating further towards base 704.

In a preferred embodiment of the present invention, adjuster 710 is snugly held in slot 703, such that it does not move within slot 703 absent force exerted by a user.

In the configuration depicted in FIG. 7b where adjuster 710 is positioned farthest from shaft 706, platform 702 is rotatable to a substantially horizontal position. It is to be noted that spring 708 (see FIG. 7a) can be configured to supply a force that opposes rotation of platform 702 towards base 704. However, in accordance with an embodiment of the present invention, the force exerted by spring 708 is sufficiently low such that, when a handset weighing a couple of ounces or more rests on platform 702, the spring 708 does not stop the movement of the platform, and the platform only comes to rest at a position when adjuster 710 abuts against surface 744. Accordingly, spring 708 acts to dampen the rotational movement of platform 702 towards base 704, while adjuster 710 defines the lower limit of rotation of platform with respect to base 704.

FIG. 7b depicts details of a head 716, in accordance with embodiments of the present invention. Housing 722 of head 716 includes a lower outer portion that is configured as a lower cylinder portion 760, is fixed with respect to head 716, and extends downwardly from the larger portion 762 that is configured to house motor 720, as shown. Fixed lower cylinder 760 is configured to house movable head insert 718, as depicted in FIG. 7b. Movable head insert 718 comprises a hollow cylinder concentrically disposed around inner shaft 766 and concentrically disposed within lower cylinder 760. Movable head insert 718 is slidably movable within lower cylinder 760, wherein movable head insert can reversibly travel from the retracted position illustrated in FIG. 7b, to the extended position illustrated in FIG. 7c.

Movable head insert 718 further includes a cap 770 that seals the hollow shaft of the movable head insert. In accordance with embodiments of the present invention, movable head insert is a rigid, lightweight material, such as a hard plastic. Because movable head insert 718 is substantially hollow, the total mass of movable head insert 718 is low, for example, less than about several grams. Accordingly, movable head insert 718 can be extended and contracted rapidly by motor 720, requiring little work to be performed by motor 720.

In accordance with an embodiment of the present invention, inner shaft 766 comprises a screw shaft that is coupled to motor 720. When motor 720 rotates, inner shaft 766 rotates in unison with the motor. Inner shaft 766 is restricted from moving along its axis, so that inner shaft 766 rotates on its axis when motor 720 rotates but does not under go any translational motion. Movable head insert 718 further comprises a threaded interior that couples to the external threaded surface of inner shaft 766. Accordingly, movable head insert 718 is rotatable in a clockwise or counterclockwise screw-type motion with respect to inner shaft 766.

Movable head insert further 718 comprises a cross-section that is the same shape and approximately the same size as an aperture 772 in lower cylinder 760 and through which movable head insert extends, even in its retracted position, as illustrated in FIG. 7b. The cross-section of movable head insert 718 and aperture 772 preferably comprises a non-circular shape, so that movable head insert 718 is prevented from rotating relative to head 716 when inner shaft 766 rotates.

Because inner shaft 766 is threaded inside movable head insert 718, rotation of inner shaft 766 in a first direction causes inner shaft 766 to move relatively inwardly into movable head insert 766, which is unable to rotate. The relatively inward motion of inner shaft 766 within movable head insert 718 causes movable head insert 718 to retract inwardly toward platform 702, as depicted in FIG. 7b, since inner shaft 766 is prevented from moving in a translational fashion along its own axis. Similarly, rotation of inner shaft in a second direction opposite the first direction causes inner shaft 766 to move relatively outwardly from movable head insert, thereby causing movable head insert to extend outwardly towards the position shown in FIG. 7c.

Figure 7C:
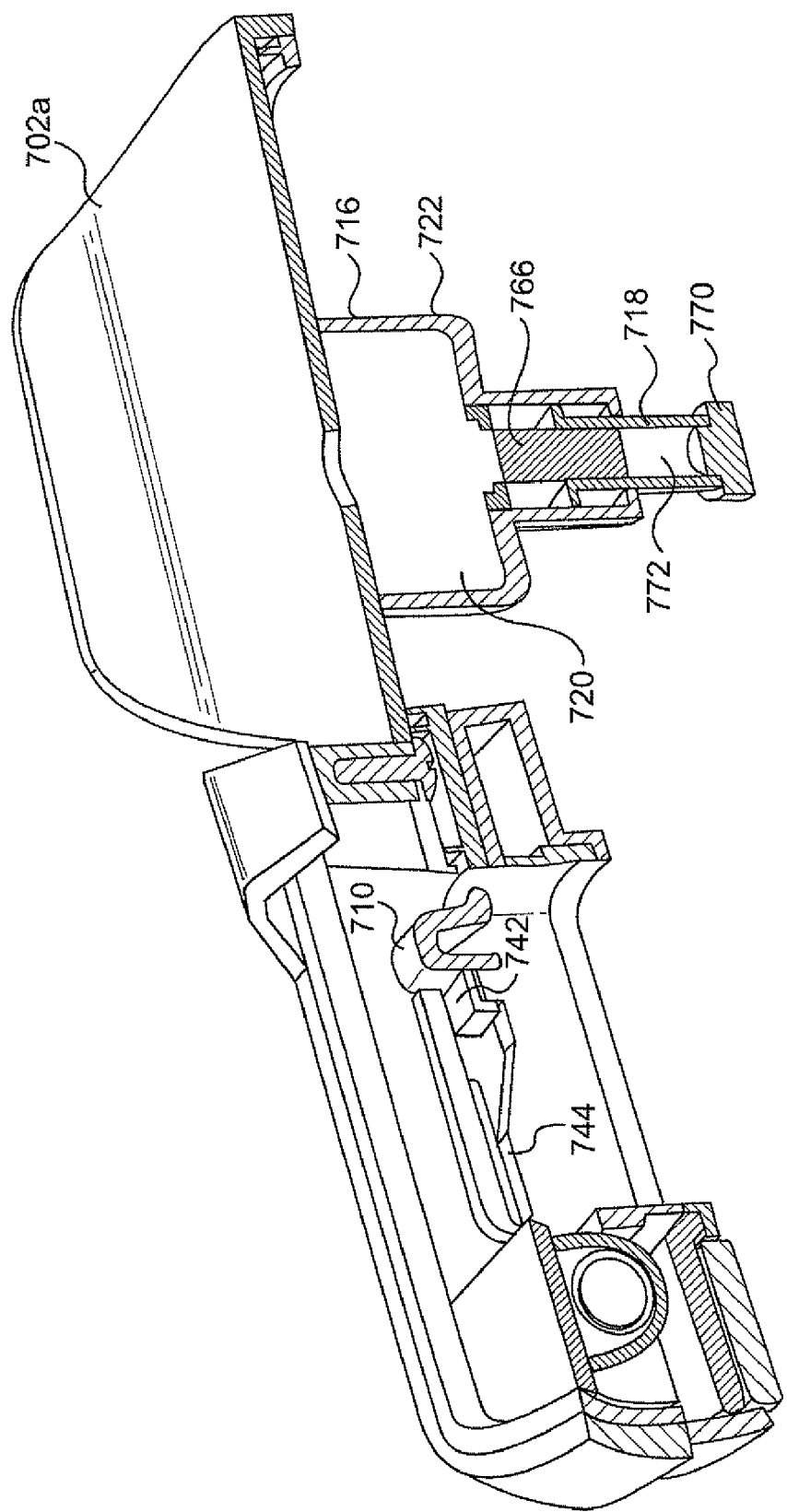
FIG. 7c illustrates a cross-sectional perspective view of the device of FIG. 7a, in the case where a movable head insert is extended.

Because motor 720 is a relatively small motor, the rotational speed of motor 720 can be several thousand RPM. For a rotational speed of three thousand RPM, and for an inner shaft 766 having a pitch of fifty threads (revolutions) per inch, the velocity of inner shaft 766 with respect to movable head insert 718 is (3000 revolutions/minute)/(50 revolutions/inch), which equals 60 inches/minute, or one inch per second. Accordingly, for an exemplary head 716 in which the total travel from the retracted position of FIG. 7b to the extended position of FIG. 7c is half an inch, the time expended in moving between retracted and extended positions is 0.5 inches/(1 inch/second), or 0.5 seconds. Thus, in accordance with embodiments of the present invention, a movable head insert, such as movable head insert 718, is configured to move from a retracted to extended position in less than one second.

FIG. 8a depicts a system 800 for hands-free operation of a phone call, in accordance with embodiments of the present invention. The term "hands-free," as used herein, refers to the fact that a user does not have to use a handset to receive, conduct, or terminate a call received at a telephone, such as a wireline telephone connected to a PSTN. System 800 includes a headset 802, headset base station 804, and a telephone accessory device 806 coupled to the headset base station through cable 808. As depicted in FIG. 8a, telephone accessory device 806 is disposed between a handset 810 and base unit 812 of a telephone 814.

In accordance with embodiments of the present invention, headset 802 is configured to communicate with telephone accessory device 806 to send signals to operate movable head portion 816 of telephone accessory device 806. Headset 802 is provided with an on/off switch 818 that is operable to toggle movable head insert 816 between an extended and a retracted position, depicted in respective FIGS. 8c and 8d, each time that switch 818 is pressed. Headset 802 is configured to be housed in base station 804 for the purposes of charging and storing headset 802. In accordance with an embodiment of the present invention, headset on/off switch 818 is only operable when headset 802 is removed from base station 804. In accordance with an embodiment of the present invention, headset 802 is operable to communicate with base unit 804 using known RF communications protocols, such as Bluetooth. Electromagnetic signals sent over the air from headset 802 to base unit 804 can be transformed into electrical signals that are forwarded from base unit 804 to telephone accessory device 806.

Figure 8B:
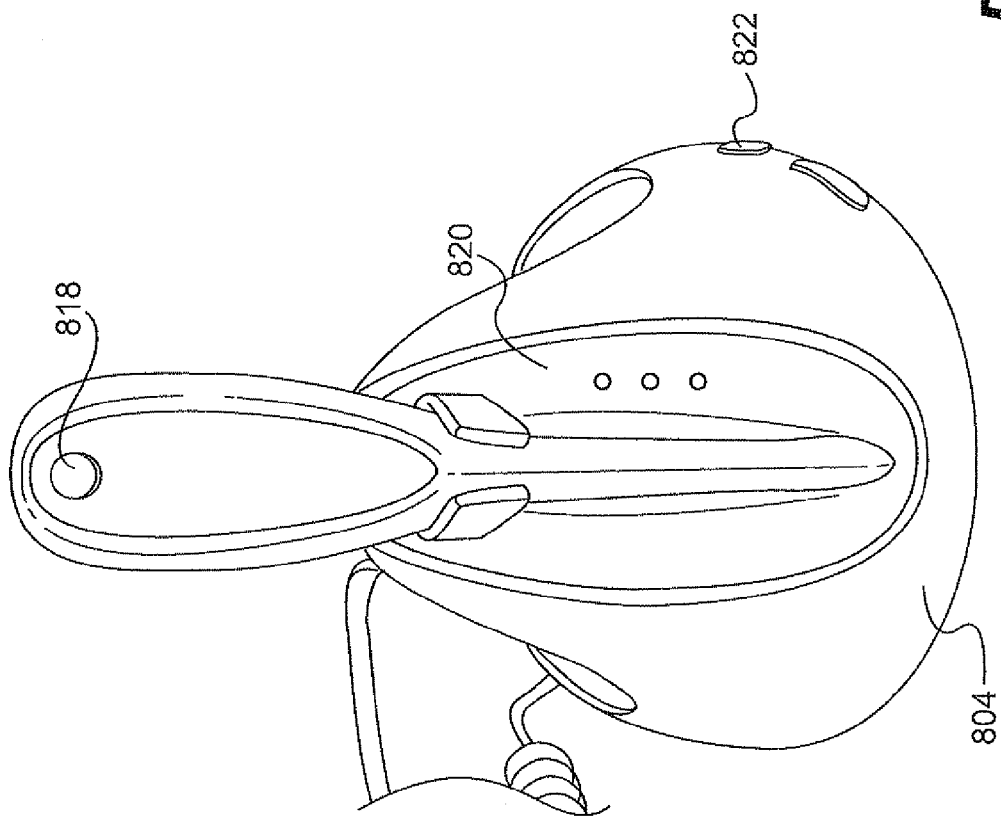

In accordance with an embodiment of the present invention, as depicted in the close-up view in FIG. 8b, base unit 804 is provided with an indicator panel 820, and a mode control button 822, which toggles base unit 804 between a "lifter mode" in which the base unit is configured to communicate with telephone accessory device 806, and a "no-lifter mode" where communications between base unit 804 and telephone accessory device are not enabled. The status of the mode of base unit 804 is indicated by indicator panel 820.

Base unit 804 is further configured with telephone wire-type receptacles that allow base unit 804 to couple to telephone 814. In one configuration of the present invention, base unit 804 includes a cable receptacle (jack) for accepting a communications cable connected to telephone accessory device 806; a power jack configured to couple to a power cable; a base jack configured to couple to telephone base 812; a curly jack configured to couple to handset 810; and a wall jack configured to couple directly to a telephone wall jack.

Figure 8C:
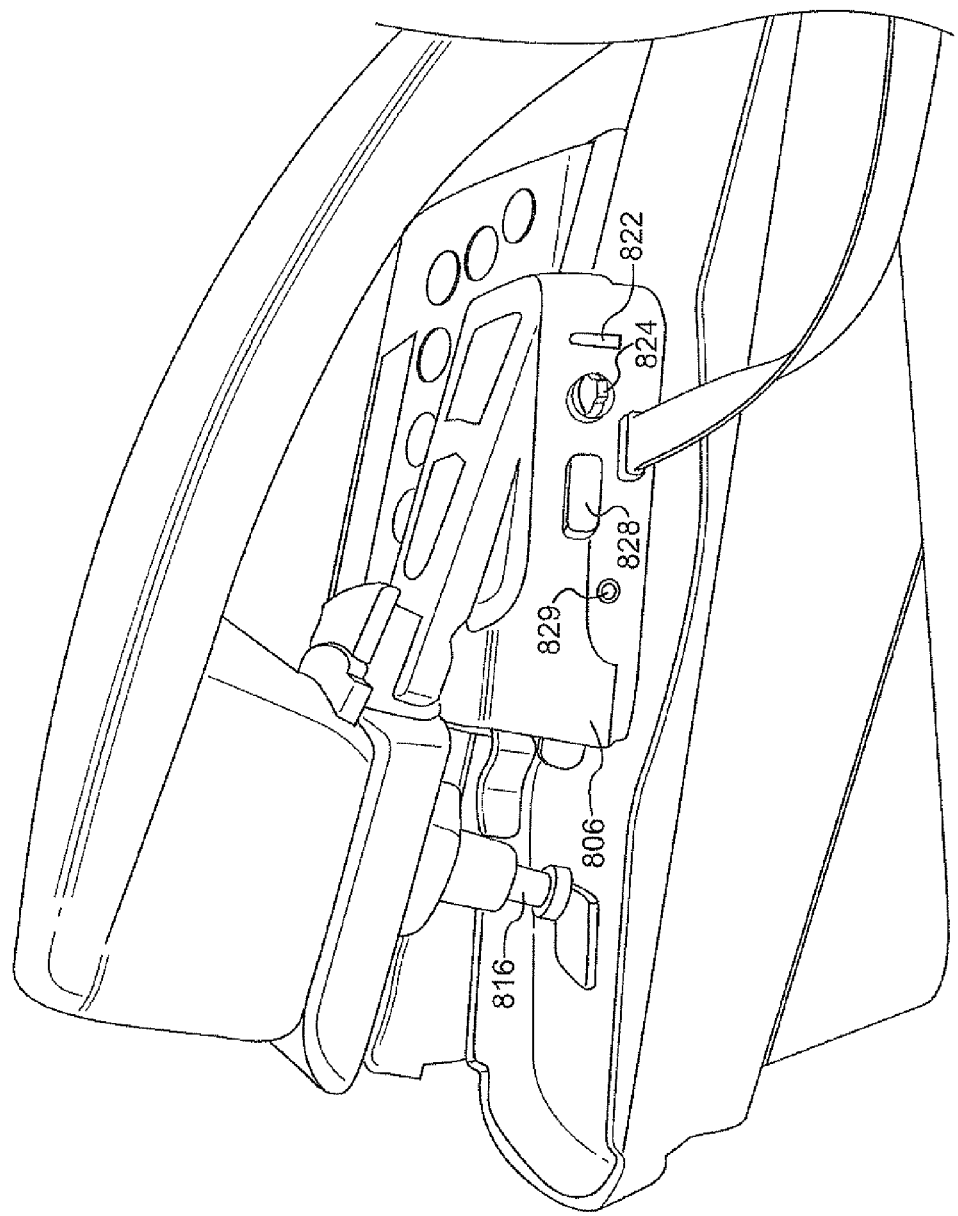

Accordingly, when telephone 814 is in an on-hook condition as depicted in FIG. 8c, and an incoming call signal directed to phone 814 is received, a signal is forwarded to headset 802, which can then be turned on by removing headset from base unit 804 if the headset is being stored on the base unit, and by pressing on/off switch 818. Subsequently, a first control signal is sent wirelessly from headset 802 to base unit 804, which triggers base unit 804 to forward a second control signal to telephone accessory device 806, causing movable head insert 816 to retract to the position shown in FIG. 5d, and thereby placing telephone 814 off-hook. In the off-hook condition, while headset 802 is in an "on" state, incoming voice signals are communicated to base unit 804, and subsequently wirelessly communicated to headset 802.

When the user of wireless headset 802 desires to terminate a connection, the user presses on/off switch 818, causing telephone accessory device 806 to extend to the position shown in FIG. 5c, placing the telephone on-hook once more and "hanging up" the telephone.

As shown in FIG. 8c, telephone accessory device 806 is provided with a status indicator 822 that is configured to display a light that apprises a viewer of the status of telephone accessory device. In accordance with an embodiment of the present invention, when movable head insert 816 is extended, the light on status indicator 822 is solid, for example, a solid blue light may be displayed. When movable head insert 816 is retracted, the light is flashing. The status indicator may also be configured to flash when an incoming call is detected. For example, status indicator 822 may flash at a rapid rate when an incoming call is detected, while it flashes at a slower rate when movable head insert is retracted. Alert on/off switch 828 is configured to toggle a ring detector device (not shown) between being turned on and off. The ring detector device includes a microphone that can be placed upon telephone 814 and includes a plug end that is configured to plug into receptacle 829. When an incoming ringing signal is emitted by telephone 814, the ringing signal is detected by the ring detector device and forwarded through base unit 804 to headset 802 if switch 828 is toggled to turn the ring detector device on. Accordingly, a user wearing a headset 802 that is not within audible range of telephone 814 can be apprised of an incoming call at telephone 814, as long as the user is within radio communications distance of base unit 804. If the ring detector device is turned off, headset 802 does not receive an alert that an incoming call is being received at telephone 814. However, even if the ring detector is turned off, a user can still take telephone 814 off-hook to receive the incoming call using headset 802, as long as the user is apprised of the incoming call, for example, by hearing telephone 814 emit a ringing sound. Sensor adjust knob 824 is configured to allow a user to vary the sensitivity of a ring detector device.

In accordance with a further embodiment of the present invention, when alert on/off switch 828 is pressed, the color of the status light also changes. Thus, for example, when the ring detector device is turned off, the color of status indicator 822 changes from blue to red.

In accordance with an embodiment of the present invention, exemplary steps involved in a method for establishing hands-free operation of a telephone include connecting a control signal cable from a telephone accessory device to the base of a headset phone (headset). The headset base is connected to a power source, for example, by connecting the headset phone base to a transformer and plugging the transformer into the power source. A mode button on the headset base is pressed until "Lifter mode" is highlighted by a light being illuminated next to an appropriate indication, such as text written on the headset base.

The headset base is coupled to the telephone accessory device using an appropriate control signal cable. Using a curly cord 830 or similar telephone wire, the headset base is coupled to a handset of a telephone that is plugged into a telephone wall jack or other connection configured to receive and transmit phone calls. The headset base is coupled to a base of the telephone using a standard telephone wire 832.

The telephone accessory device is placed over a cradle of a telephone, wherein the movable head insert is located above a hook switch of the telephone. The headset is charged and removed from the headset base. An "On/Off" key is depressed until the movable head insert is extended, thereby depressing the hook-switch and placing the telephone on-hook.

An indication of an incoming phone call is received. The headset is removed from the headset base for operation of the headset. The "On/Off" key is depressed for a first time, wherein the movable head insert retracts, the telephone is placed off-hook, and the user is free to conduct a conversation with the calling party using the headset. The telephone is placed back on-hook when the user depresses the "On/Off" key a second time.

The foregoing disclosure of the embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible.

What is claimed is:

1. A device to reversibly depress and release a hook switch button of a wireline telephone, comprising:
   circuitry to receive an alert of an incoming telephone call at the wireline telephone from a headset coupled to the wireline telephone;
   a platform configured to support a handset on a first surface of the device platform; and
   a head portion disposed on a second surface of the platform opposite to the first surface,
   wherein, when the handset is resting on the first surface, the head portion is operable to activate between an outward position and an inward position to reversibly depress and release, in response to a respective "off" and "on" signal received from the headset by the circuitry, a switch hook button of the wireline telephone while the platform remains stationary.

2. The device of claim 1, further comprising:
   a body portion connected to the platform; and
   a body spring extending between the body portion and the platform and exerting a force tending to move at least a portion of the platform outwardly from the body,
   wherein, when no external object is resting on the first surface, the head portion is configured such that, even when the head portion is in the outward position, the head portion is spaced apart from the switch hook button.

3. The device of claim 2, wherein the platform is pivotally connected to the body portion at a first end of the platform and is configured to support a handset of the wireline telephone on the first surface at a second end opposite the first end, wherein the body spring exerts a force tending to pivot the platform outwardly from the head portion.

4. The device of claim 1, wherein the telephone is one of a corded telephone and a cordless telephone.

5. A telephone accessory device for facilitating communication between a headset and a wireline telephone, comprising:
   a body configured to rest on top of a base of the wireline telephone between speaker and microphone recesses in a cradle area of the base;
   a platform pivotally connected to the body at a first end of the platform and configured to support a handset of the wireline telephone on a first surface of the platform at a second end of the platform opposite to the first end; and
   a head portion disposed at the second end on a second surface of the platform opposite to the first surface,
   wherein, when the handset is resting on the first surface at the second end, the head portion is operable to reversibly depress and release a switch hook button in the speaker recess while the body and platform remain stationary.

6. The telephone accessory device of claim 5,
   wherein the body comprises a substantially planar lower surface,
   wherein the platform defines a plane, and
   wherein, when the handset is resting on the first surface at the second end, the plane defined by the platform is configured to form an angle of less than about thirty degrees with respect to the lower surface of the device body.

7. The telephone accessory device of claim 5, wherein the head portion comprises:
   an outer portion that is configured to remain stationary with respect to the platform during operation of the telephone accessory device; and
   a movable head insert slidably movable away from and toward the platform in a direction substantially perpendicular to a plane defined by the device platform,
   wherein, when the handset is resting on the first surface at the second end:
      when the movable head insert is in a first position, the switch hook button is outwardly extended from the speaker recess in the cradle area so as to create an off-hook condition, and
      when the movable head insert is in a second position, the switch hook button is depressed downwardly toward the speaker recess in the cradle area so as to create an on-hook condition.

8. The telephone accessory device of claim 7, further comprising a body spring coupled to the body and the platform and exerting a force tending to resist rotational movement of the platform toward the body,
   wherein, when no external object is resting on the first surface at the second end, the head portion is configured such that, even when the movable head insert is in the second position, the movable head insert is spaced apart from the switch hook button.

9. The telephone accessory device of claim 7, wherein the head portion further comprises:
a head spring coupled to the movable head insert;
a switch operable to receive a first electrical signal to place the movable head insert in the first position and to receive a second electrical signal to place the movable head insert in the second position; and
a motor configured to control movement of the movable head insert between the second and first positions.

10. The telephone accessory device of claim 9, wherein, when the movable head insert is in the first position, the head spring exerts a force urging the movable head insert outwardly from the outer portion of the head.

11. The telephone accessory device of claim 9, wherein, when the movable head insert is in the second position, the head spring exerts a force urging the movable head insert inwardly from the outer portion of the head.

12. The telephone accessory device of claim 7, further comprising circuitry configured to receive a first and second radio signal from a headset, wherein the first radio signal triggers the movable head insert to be in the first position and wherein the second radio signal triggers the movable head insert to be in the second position.

13. The telephone accessory device of claim 7, wherein the head portion is adjustable to adjust a distance between the first position and second position.

14. The telephone accessory device of claim 5, further comprising electrical circuitry configured to receive a first and a second radio signal from a headset, wherein the first radio signal triggers the head portion of the telephone accessory device to depress the switch hook button and wherein the second radio signal triggers the head portion to release the switch hook button.

15. The telephone accessory device of claim 5, wherein the head portion includes a fixed portion fixedly attached to the platform during operation of the telephone accessory device and a movable portion slidably movable with respect to the platform during operation of the telephone accessory device in a direction substantially perpendicular to the platform.

16. The telephone accessory device of claim 15, wherein the fixed portion and movable portion are configured as an inner portion that is substantially cylindrical and an outer portion that surrounds at least a portion of the inner portion.

17. The telephone accessory device of claim 5, wherein the platform is configured to support a telephone handset simultaneously on both first and second ends.

18. A telephone accessory system configured to provide handsfree communication using a wireline telephone, comprising:
a wireless headset;
a headset base unit configured for wireless communication with the wireline headset; and
a hook switch actuator configured to rest between a handset and base of the wireline telephone, and coupled to the headset base through a wired connection,
wherein the hook switch actuator is operable to receive signals from the headset when an active state of the headset is initiated and when the active state is terminated,
wherein the hook switch actuator is operable to depress a hook switch in the base of the wireline telephone without movement of the handset when the active state of the headset is terminated, and
wherein the hook switch actuator is operable to release the hook switch in the base of the wireline telephone without movement of the handset when the active state of the headset is initiated.

19. The telephone accessory system of claim 18, wherein the hook switch actuator comprises:
a body configured to rest on top of a base of the wireline telephone between speaker and microphone recesses in a cradle area of the base;
a platform pivotally connected to the body at a first end of the platform and configured to support a corded handset on a first surface of the platform at a second end opposite to the first end; and
a head portion disposed at the second end on a second surface of the platform opposite to the first surface,
wherein, when the corded handset is resting on the first surface at the second end, the head portion is operable to reversibly depress and release the hook switch in the speaker recess while the body and platform remain stationary.

20. The telephone accessory system of claim 19, further comprising electrical circuitry configured to receive a first and second radio signal from the headset, wherein the first radio signal triggers the head portion of the hook switch actuator to depress the hook switch and wherein the second radio signal triggers the head portion to release the hook switch.

21. The telephone accessory system of claim 19, wherein a position of the head portion along the platform is adjustable.

22. The telephone accessory system of claim 19, wherein the platform further comprises an adjuster that is configured to limit a rotation of the platform toward the base.

23. The telephone accessory system of claim 22, wherein the adjuster is slidably disposed along the platform, wherein the adjuster includes one or more protuberances that are configured to engage the base on one or more surfaces of the base when the platform rotates toward the base.

24. The telephone accessory system of claim 22, wherein the one or more surfaces of the base include respective one or more inclined portions that are configured to accommodate the protuberances.

25. The telephone accessory system of claim 18, wherein the headset base unit comprises:
a control cable connector configured to accept a control cable that communicates control signals between the headset base unit and the hook switch actuator; and
a set of connectors configured to accept telephone wires that send voice signals between the headset base unit and wireline telephone.

26. The telephone accessory system of claim 18, wherein the headset base unit is configured for operation in a first mode, wherein the telephone accessory system is operable to send control signals between the headset and the hook switch actuator, and a second mode wherein the telephone accessory system is not operable to send control signals between the headset and the hook switch actuator.

27. The telephone accessory system of claim 18, wherein the head portion comprises:
a motor;
a lower outer portion that is configured to remain stationary with respect to the platform during operation of the hook switch actuator; and
a movable head insert at least partially encompassed by the lower outer portion, coupled to the motor, and slidably movable away from and toward the platform in a direction substantially perpendicular to a plane defined by the platform, wherein, when the corded handset is resting on the first surface at the second end:

when the movable head insert is in a first position, the hook switch is outwardly extended from the speaker recess in the cradle area so as to create an off-hook condition, and when the movable head insert is in a second position, the hook switch is depressed downwardly toward the speaker recess in the cradle area so as to create an on-hook condition.

28. The telephone accessory system of claim 27, wherein the hook switch actuator further comprises a body spring coupled to the body and the platform, and exerting a force tending to oppose rotation of the platform toward the body, wherein, when no external object is resting on the first surface, the head portion is configured such that, even when the movable head insert is in the second position, the hook switch is outwardly extended from the speaker recess in the cradle area so as to create an off-hook condition.

29. The telephone accessory system of claim 27, wherein the head portion further comprises a screw shaft that comprises a rod having outer threads and is concentrically disposed within the lower outer portion, and at least partially disposed within the movable head insert, wherein the motor is configured to rotate the screw shaft;

wherein the movable head insert comprises a hollow cylinder having an inner surface that includes threads configured to couple to the outer threads of the screw shaft, wherein when the screw shaft rotates in a first direction, the movable head insert retracts inwardly toward the platform, and wherein when the screw shaft rotates in a second direction opposite to the first direction the movable head insert moves outwardly away from the platform.

* * * * *

UNITED STATES PATENT AND TRADEMARK OFFICE
CERTIFICATE OF CORRECTION

PATENT NO. : 8,130,943 B2
APPLICATION NO. : 12/252038
DATED : March 6, 2012
INVENTOR(S) : Zheng Yong Jian and Ma Hong Zhen It is certified that error appears in the above-identified patent and that said Letters Patent is hereby corrected as shown below:

Column 17, line 56, change "the device platform" to --the platform--.

Signed and Sealed this
Twenty-second Day of May, 2012

David J. Kappos
*Director of the United States Patent and Trademark Office*